(12) United States Patent
Xu et al.

(10) Patent No.: US 11,022,353 B2
(45) Date of Patent: Jun. 1, 2021

(54) PULSE TUBE CRYOCOOLER AND ROTARY VALVE UNIT FOR PULSE TUBE CRYOCOOLER

(71) Applicant: SUMITOMO HEAVY INDUSTRIES, LTD., Tokyo (JP)

(72) Inventors: Mingyao Xu, Nishitokyo (JP); Qian Bao, Nishitokyo (JP); Takaaki Morie, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 91 days.

(21) Appl. No.: 16/568,243

(22) Filed: Sep. 11, 2019

(65) Prior Publication Data

US 2020/0003466 A1 Jan. 2, 2020

Related U.S. Application Data

(63) Continuation of application No. PCT/JP2018/005000, filed on Feb. 14, 2018.

(30) Foreign Application Priority Data

Mar. 13, 2017 (JP) .............................. JP2017-047747

(51) Int. Cl.
*F25B 41/20* (2021.01)
*F16K 3/02* (2006.01)
*F25B 9/14* (2006.01)

(52) U.S. Cl.
CPC ................ *F25B 41/20* (2021.01); *F16K 3/02* (2013.01); *F25B 9/145* (2013.01); *F25B 2309/14181* (2013.01); *F25B 2600/2521* (2013.01)

(58) Field of Classification Search
CPC .. F25B 41/20; F25B 9/00; F25B 9/145; F25B 2309/14181; F25B 2600/2521; F16K 3/02; F16K 31/01; F16K 11/074
See application file for complete search history.

(56) References Cited

U.S. PATENT DOCUMENTS

| 5,927,081 A | 7/1999 | Li |
| 9,644,867 B2 | 5/2017 | Xu |

(Continued)

FOREIGN PATENT DOCUMENTS

| JP | H08-271074 A | 10/1996 |
| JP | H10-232057 A | 9/1998 |

(Continued)

*Primary Examiner* — Emmanuel E Duke
(74) *Attorney, Agent, or Firm* — HEA Law PLLC

(57) ABSTRACT

A rotary valve unit includes a rotary valve and a reversible motor. The rotary valve operates according to a cooling valve timing for cooling a pulse tube cryocooler when the reversible motor rotates in a forward direction and is operated according to a heating valve timing for heating the pulse tube cryocooler when the reversible motor rotates in a backward direction. The cooling valve timing is designed to generate a working gas pressure oscillation in a pulse tube and apply a first phase delay to a working gas displacement oscillation in the pulse tube with respect to the working gas pressure oscillation. The heating valve timing is designed to generate the working gas pressure oscillation in the pulse tube and apply a second different phase delay to the working gas displacement oscillation in the pulse tube with respect to the working gas pressure oscillation.

9 Claims, 13 Drawing Sheets

(56) References Cited

U.S. PATENT DOCUMENTS

| | | | |
|---|---|---|---|
| 2002/0066276 A1* | 6/2002 | Kawano | F25B 9/145 62/6 |
| 2005/0115247 A1 | 6/2005 | Gao et al. | |
| 2007/0144594 A1* | 6/2007 | Moon | F16K 37/0058 137/625.46 |
| 2011/0094244 A1* | 4/2011 | Xu | F25B 9/145 62/6 |
| 2014/0238047 A1* | 8/2014 | Xu | F25B 9/145 62/6 |
| 2014/0261697 A1* | 9/2014 | Vaughan | C02F 1/42 137/1 |
| 2015/0001428 A1 | 1/2015 | Xu et al. | |

FOREIGN PATENT DOCUMENTS

| | | |
|---|---|---|
| JP | 2000-046426 A | 2/2000 |
| JP | 2001-324232 A | 11/2001 |
| JP | 2008-544199 A | 12/2008 |
| JP | 2011-094833 A | 5/2011 |

\* cited by examiner

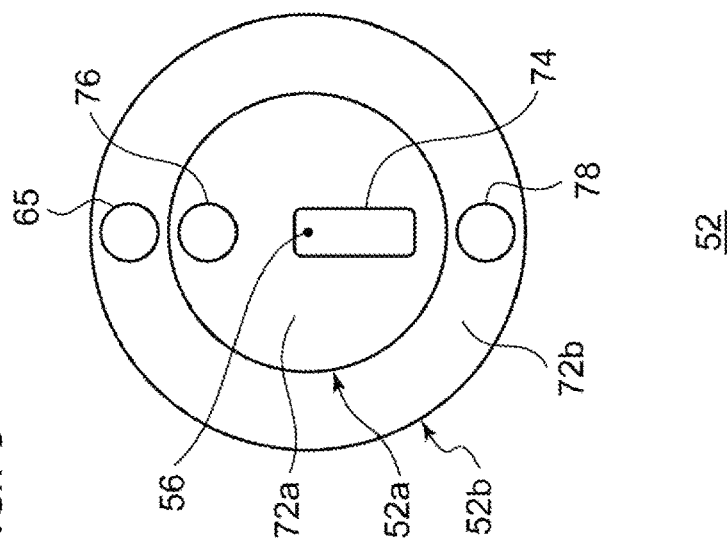
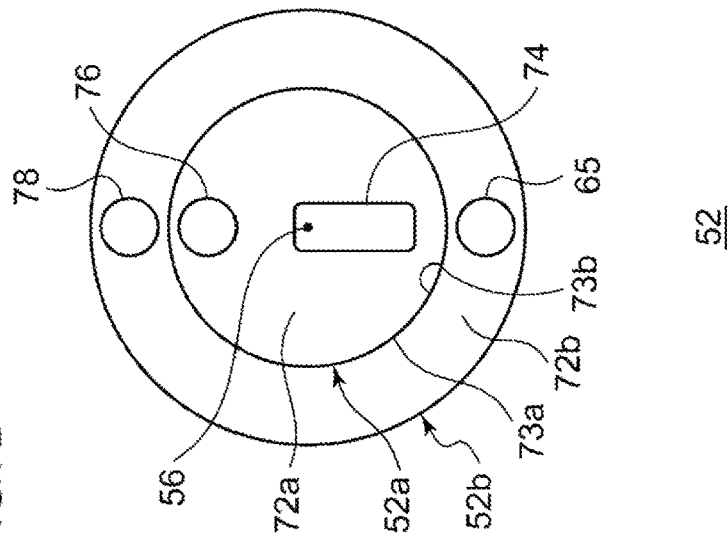
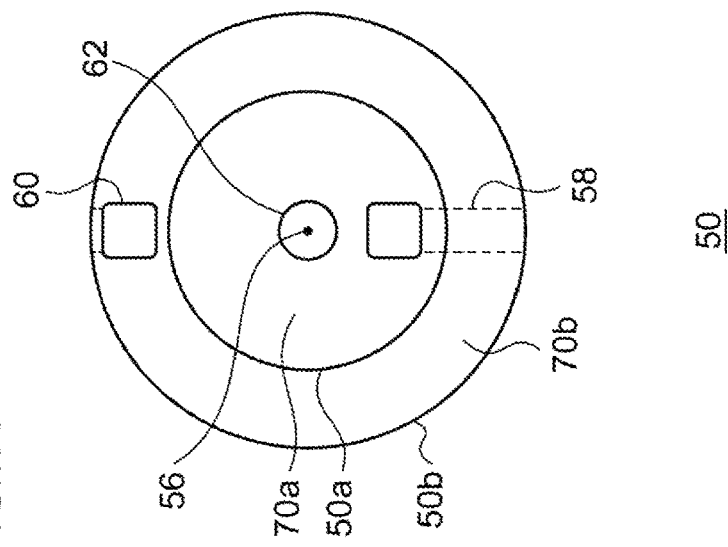

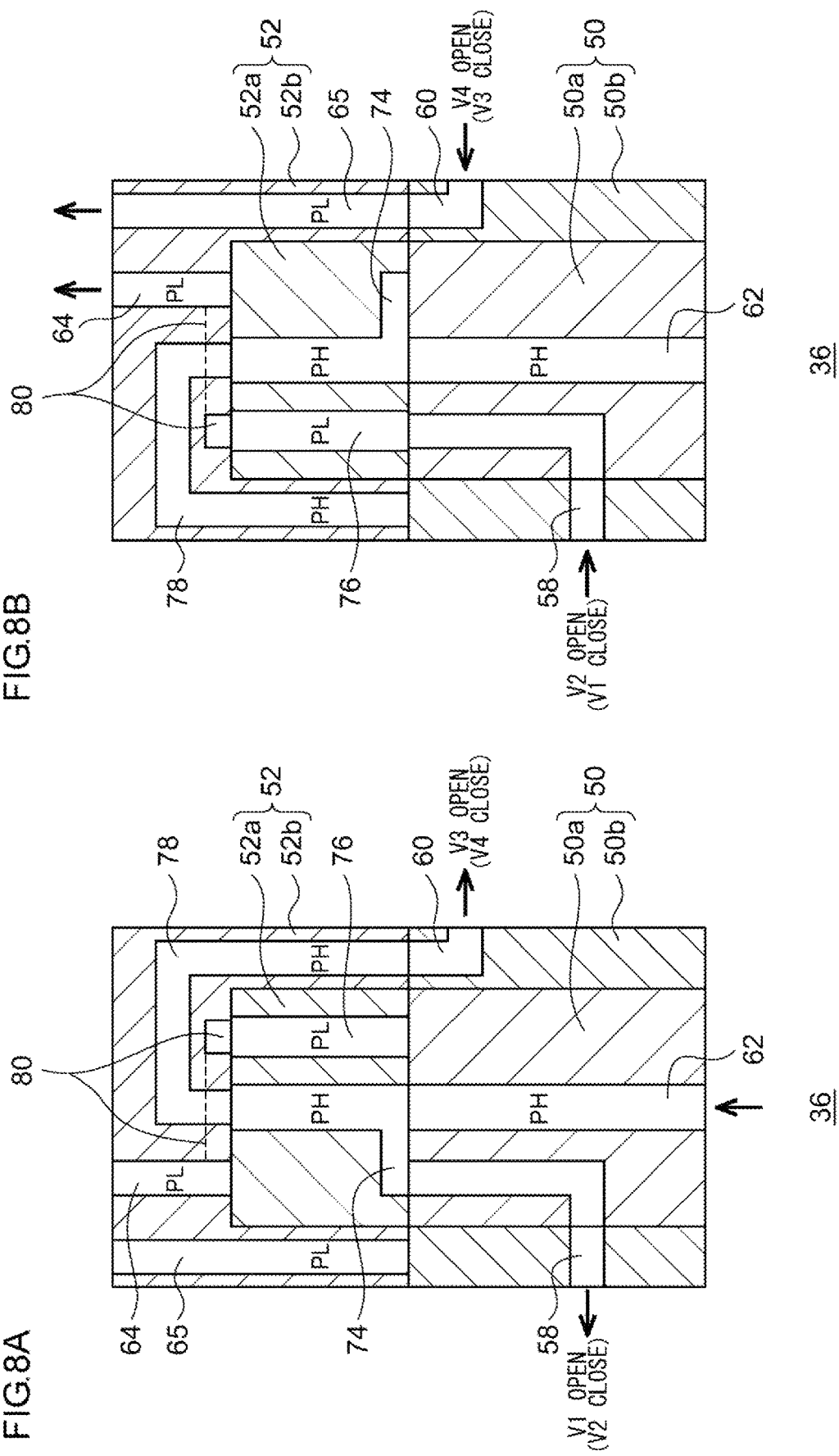

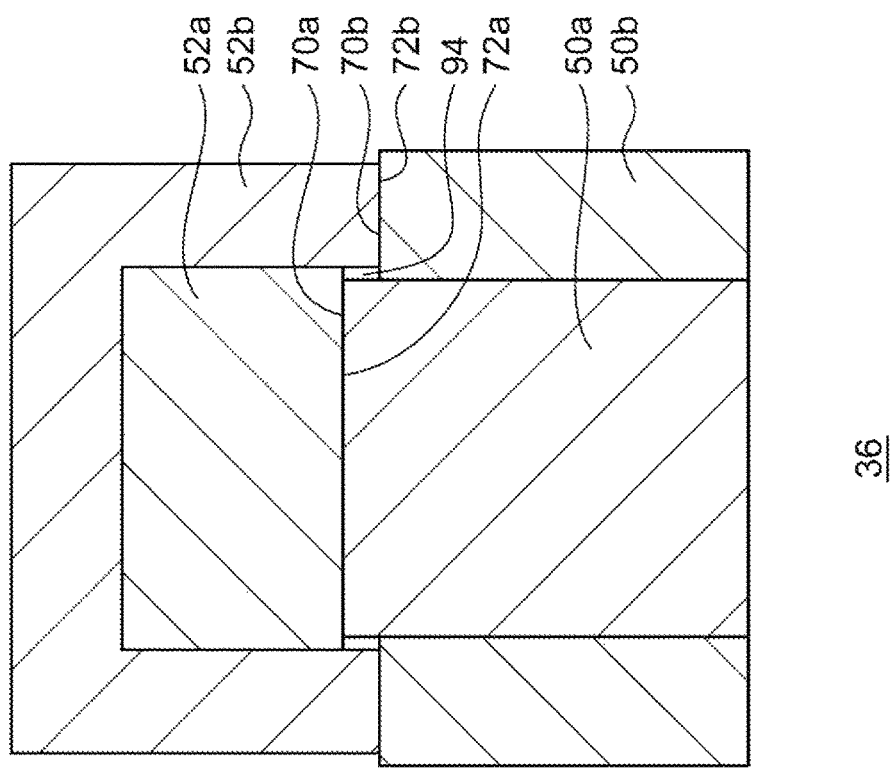
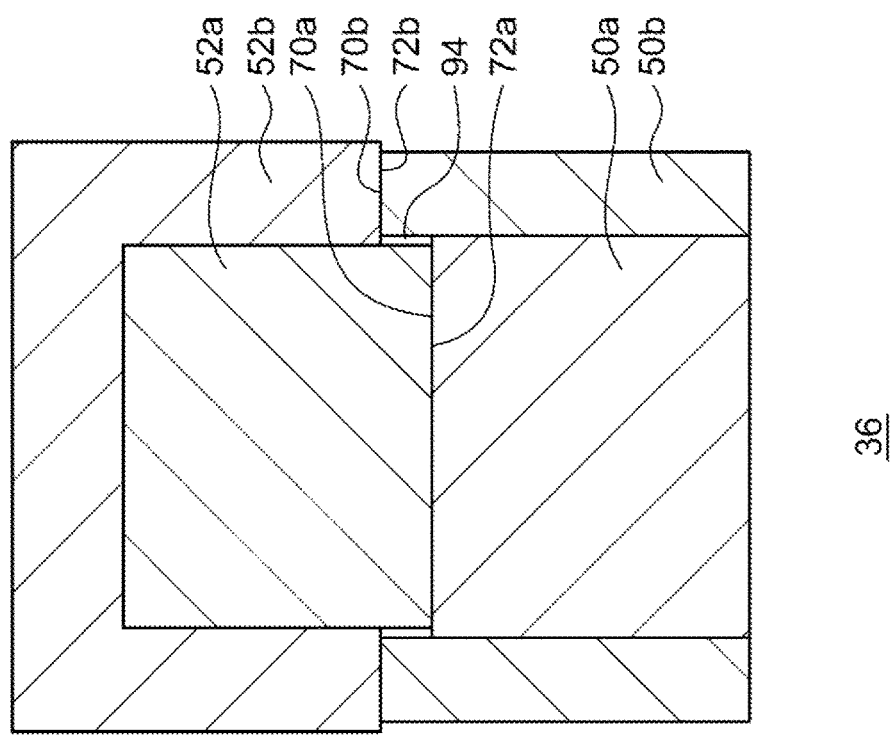

US 11,022,353 B2

PULSE TUBE CRYOCOOLER AND ROTARY VALVE UNIT FOR PULSE TUBE CRYOCOOLER

RELATED APPLICATIONS

The contents of Japanese Patent Application No. 2017-047747, and of International Patent Application No. PCT/JP2018/005000, on the basis of each of which priority benefits are claimed in an accompanying application data sheet, are in their entirety incorporated herein by reference.

BACKGROUND

Technical Field

Certain embodiments of the present invention relate to a pulse tube cryocooler and a rotary valve unit for a pulse tube cryocooler.

Description of Related Art

In general, a pulsating working gas pressure is supplied into the pulse tube, and thus, a pulse tube cryocooler is cooled. In order to return a temperature of the cooled pulse tube cryocooler to the room temperature, in the related art, the cooled pulse tube cryocooler is heated by a natural temperature rise or an electric heater. The natural temperature rise takes times. The electric heater complicates a structure of the pulse tube cryocooler. As another method, a method is proposed, in which a cooling operation (that is, pulsating flow of working gas) is stopped, and thereafter, the working gas constantly flows in one direction from a pulse tube to a regenerator to increase a temperature of a pulse tube cryocooler. A one-way flow of the working gas is supplied from a compressor and returned to the compressor again through the pulse tube and the regenerator. A working gas at the room temperature circulates through the pulse tube cryocooler in one direction.

SUMMARY

According to an embodiment of the present invention, there is provided a pulse tube cryocooler including: a regenerator which has a regenerator high-temperature end and a regenerator low-temperature end; a pulse tube which has a pulse tube high-temperature end and a pulse tube low-temperature end in communication with the regenerator low-temperature end; a rotary valve which alternately connects the regenerator high-temperature end to a compressor discharge port and a compressor suction port to generate a working gas pressure oscillation in the pulse tube and is connected to the pulse tube high-temperature end to control a phase delay of a working gas displacement oscillation in the pulse tube with respect to the working gas pressure oscillation, the rotary valve being operated according to a cooling valve timing for cooling the pulse tube cryocooler or a heating valve timing for heating the pulse tube cryocooler; and a reversible motor which is connected to the rotary valve to rotate the rotary valve around a rotary valve rotation axis. The rotary valve is configured to operate according to the cooling valve timing when the reversible motor rotates forward and operate according to the heating valve timing when the reversible motor rotates backward. The cooling valve timing is designed to generate the working gas pressure oscillation and apply a first phase delay to the working gas displacement oscillation with respect to the working gas pressure oscillation. The heating valve timing is designed to generate the working gas pressure oscillation and apply a second phase delay to the working gas displacement oscillation with respect to the working gas pressure oscillation, and the second phase delay is different from the first phase delay.

According to another embodiment of the present invention, there is provided a pulse tube cryocooler including: a regenerator which has a regenerator high-temperature end and a regenerator low-temperature end; a pulse tube which has a pulse tube high-temperature end and a pulse tube low-temperature end in communication with the regenerator low-temperature end; a group of valves which alternately connect the regenerator high-temperature end to a compressor discharge port and a compressor suction port to generate a working gas pressure oscillation in the pulse tube and are connected to the pulse tube high-temperature end to control a phase delay of a working gas displacement oscillation in the pulse tube with respect to the working gas pressure oscillation, the group of valves being operated according to a cooling valve timing for cooling the pulse tube cryocooler or a heating valve timing for heating the pulse tube cryocooler; and a switching device configured to perform switching between the cooling valve timing and the heating valve timing. The cooling valve timing is designed to generate the working gas pressure oscillation and apply a first phase delay to the working gas displacement oscillation with respect to the working gas pressure oscillation. The heating valve timing is designed to generate the working gas pressure oscillation and apply a second phase delay to the working gas displacement oscillation with respect to the working gas pressure oscillation, and the second phase delay is different from the first phase delay.

According to still another embodiment of the present invention, there is provided rotary valve unit for a pulse tube cryocooler, including: a rotary valve which alternately connects a regenerator high-temperature end to a compressor discharge port and a compressor suction port to generate a working gas pressure oscillation in a pulse tube and is connected to a pulse tube high-temperature end to control a phase delay of a working gas displacement oscillation in the pulse tube with respect to the working gas pressure oscillation, the rotary valve being operated according to a cooling valve timing for cooling the pulse tube cryocooler or a heating valve timing for heating the pulse tube cryocooler; and a reversible motor which is connected to the rotary valve to rotate the rotary valve around a rotary valve rotation axis. The rotary valve is configured to operate according to the cooling valve timing when the reversible motor rotates forward and operate according to the heating valve timing when the reversible motor rotates backward. The cooling valve timing is designed to generate the working gas pressure oscillation and apply a first phase delay to the working gas displacement oscillation with respect to the working gas pressure oscillation. The heating valve timing is designed to generate the working gas pressure oscillation and apply a second phase delay to the working gas displacement oscillation with respect to the working gas pressure oscillation, and the second phase delay is different from the first phase delay.

BRIEF DESCRIPTION OF THE DRAWINGS

FIGS. 7A to 7C are schematic plan views showing a rotation sliding surface of the rotary valve unit according to the embodiment.

FIGS. 8A and 8B are schematic cross-sectional diagrams of a rotary valve showing a flow path connection at the cooling valve timing.

FIGS. 13A and 13B are schematic cross-sectional views showing a rotary valve according to still another embodiment.

DETAILED DESCRIPTION

Figure 1:
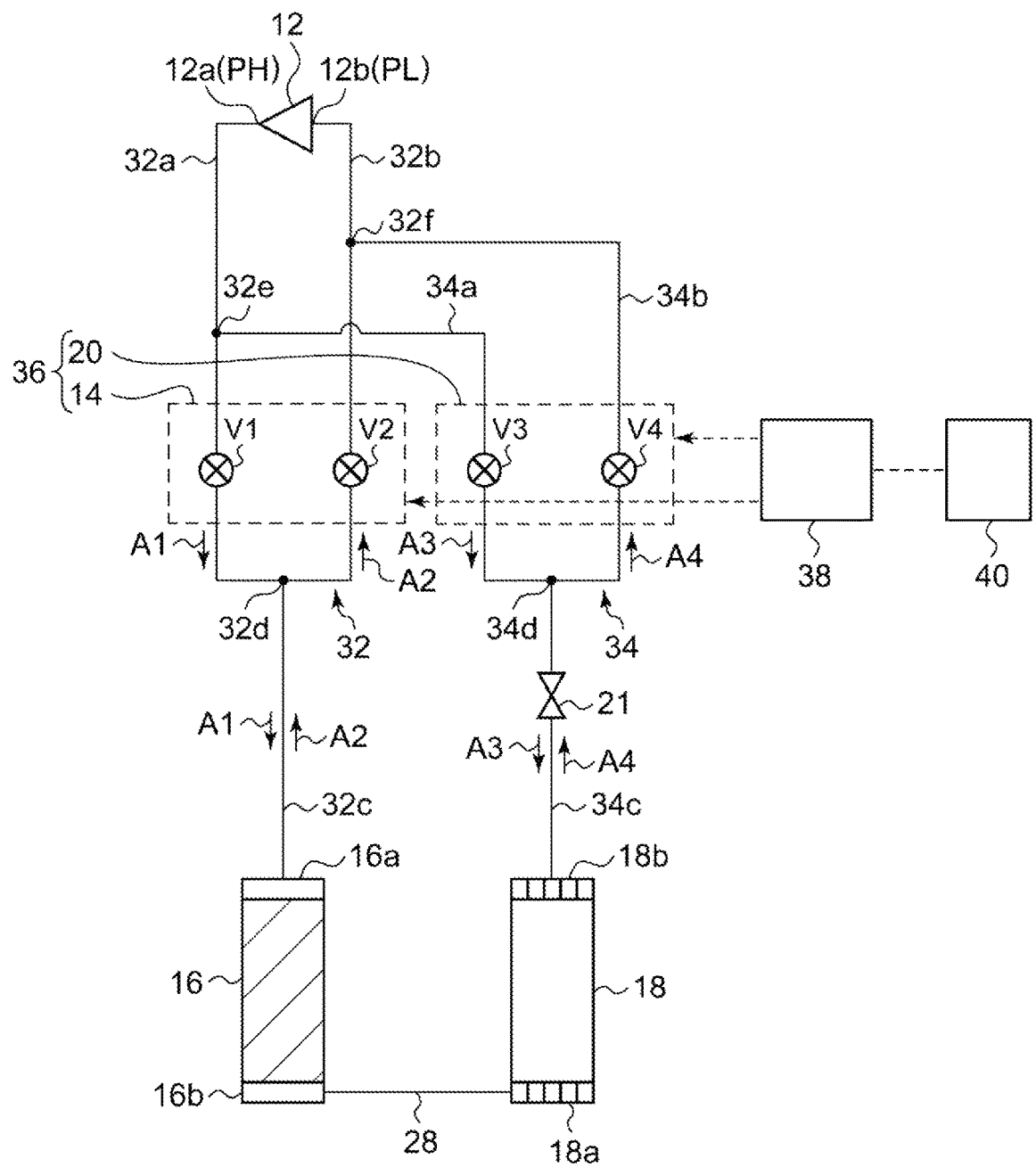
FIG. 1 is a diagram schematically showing a pulse tube cryocooler according to an embodiment.

It is desirable to provide a temperature rising technology for a pulse tube cryocooler.

In addition, aspects of the present invention include arbitrary combinations of the above-described elements and mutual substitution of elements or expressions of the present invention among apparatuses, methods, systems, or the like.

According to the present invention, it is possible to provide an improved temperature rising technology for a pulse tube cryocooler.

Hereinafter, embodiments of the present invention will be described in detail with reference to the drawings. In the description and the drawings, the reference signs are assigned to the same or equivalent components, members, and processing, and repeated descriptions will be appropriately omitted. Scales and shapes of respective portions shown are set conveniently for ease of explanation, and are not to be interpreted as being limited unless otherwise noted. The embodiments are illustrative and do not limit a scope of the present invention. All features or combinations thereof described in the embodiments are not necessarily essential to the invention.

In a GM cryocooler, in the related art, so-called reverse heating is known. When a displacer drive motor rotates forward, a refrigeration cycle is formed, and when the motor rotates backward, a temperature rising cycle is formed. By switching a motor rotation direction, the GM cryocooler can be switched between the refrigeration and the temperature rise. In the temperature raising cycle, adiabatic compression of a working gas is generated in an expansion chamber, and as a result, the GM cryocooler can be heated by generated compression heat. Because the compression heat is used, the temperature of the GM cryocooler can be increased in a short time as compared with a natural temperature rise. In addition, according to the reverse heating, it is possible to heat the GM cryocooler without providing an additional heating element such as an electric heater.

However, in a pulse tube cryocooler of the related art, as in the GM cryocooler, compression heat is not generated in the pulse tube cryocooler even if a rotation direction of a valve drive motor is reversed. On the contrary, rather, cold is generated. In the pulse tube cryocooler, although cooling efficiency approximately equal to cooling efficiency at the time of a forward rotation cannot be obtained, the refrigeration cycle can be formed even at the time of a backward rotation of the motor. This is due to a structural difference between the GM cryocooler and the pulse tube cryocooler, in which the GM cryocooler has a solid displacer whereas the pulse tube cryocooler does not have the solid displacer. Therefore, there is no example where the reverse heating which is possible in the GM cryocooler has been applied to the pulse tube cryocooler. Such a problem is not limited to a pulse tube cryocooler having a valve drive motor, but may occur also for a pulse tube cryocooler or other pulse tube cryocoolers driven by a solenoid valve.

As will be described in detail below, a pulse tube cryocooler according to an embodiment can increase temperature using compression heat of a working gas. Therefore, the temperature of the pulse tube cryocooler can increase in a short time as compared with a natural temperature rise. The pulse tube cryocooler can also be heated without providing the additional heating element such as the electric heater.

FIG. 1 is a diagram schematically showing a pulse tube cryocooler according to an embodiment.

A pulse tube cryocooler 10 is a so-called four-valve type pulse tube cryocooler. Accordingly, the pulse tube cryocooler 10 includes an oscillating flow source having a compressor 12 and a main pressure switching valve 14, and a phase control mechanism having a regenerator 16, a pulse tube 18, an auxiliary pressure switching valve 20 and, an optional flow rate adjustment element 21. The oscillatory flow source and the phase control mechanism share the compressor 12. The pulse tube cryocooler 10 is a single-stage cryocooler as shown.

The compressor 12 has a compressor discharge port 12a through which the working gas is supplied to the regenerator 16 and the pulse tube 18, and a compressor suction port 12b through which the working gas is recovered from the regenerator 16 and the pulse tube 18. The compressor 12 is configured to compress a recovered low-pressure (PL) working gas so as to generate a high-pressure (PH) working gas. The compressor discharge port 12a and the compressor suction port 12b function as a high-pressure source and a low-pressure source of the pulse tube cryocooler 10, respectively. The working gas is also referred to as a refrigerant gas and is a helium gas, for example.

The regenerator 16 has a regenerator inlet end 16a and a regenerator outlet end 16b. The regenerator inlet end 16a and the regenerator outlet end 16b may be referred to as a regenerator high-temperature end and a regenerator low-temperature end, respectively.

The pulse tube 18 has a pulse tube inlet end (or low-temperature end heat exchanger) 18a and a pulse tube outlet end (or high-temperature end heat exchanger) 18b. The pulse tube inlet end 18a communicates with the regenerator outlet end 16b through a communication passage 28. The pulse tube inlet end 18a and the pulse tube outlet end 18b may be referred to as a pulse tube low-temperature end and a pulse tube high-temperature end, respectively.

The pulse tube cryocooler 10 includes a main piping system 32 which connects the compressor 12 to the regenerator inlet end 16a. The main piping system 32 includes a main supply path 32a which connects the compressor discharge port 12a to the regenerator inlet end 16a and a main exhaust path 32b which connects the compressor suction port 12b to the regenerator inlet end 16a.

Further, the main piping system 32 includes a main bidirectional flow path 32c which is a portion of the main supply path 32a and a portion of the main exhaust path 32b, and a main connection point 32d which is located between the main pressure switching valve 14 and the regenerator inlet end 16a. The main supply path 32a joins the main exhaust path 32b at the main connection point 32d. The main bidirectional flow path 32c extends from the main connection point 32d to the regenerator inlet end 16a. The main supply path 32a has a supply branch point 32e located between the compressor discharge port 12a and the main pressure switching valve 14. The main exhaust path 32b has an exhaust junction 32f located between the compressor suction port 12b and the main pressure switching valve 14.

The main pressure switching valve 14 is disposed in the main piping system 32. The main pressure switching valve 14 is configured such that the compressor discharge port 12a or the compressor suction port 12b selectively communicates with the regenerator inlet end 16a to apply a pressure oscillation of the working gas to the pulse tube 18.

The main pressure switching valve 14 has a main intake on/off valve V1 and a main exhaust on/off valve V2. The main intake on/off valve V1 is disposed in the main supply path 32a between the supply branch point 32e and the main connection point 32d. The main exhaust on/off valve V2 is disposed in the main exhaust path 32b between the exhaust junction 32f and the main connection point 32d.

The main pressure switching valve 14 is configured such that the main intake on/off valve V1 and the main exhaust on/off valve V2 are respectively opened exclusively. That is, simultaneous opening of the main intake on/off valve V1 and the main exhaust on/off valve V2 is prohibited. When the main intake on/off valve V1 is open, the main exhaust on/off valve V2 is closed. As shown by an arrow A1, the working gas is supplied from the compressor discharge port 12a to the regenerator 16 through the main supply path 32a. Meanwhile, when the main exhaust on/off valve V2 is open, the main intake on/off valve V1 is closed. As shown by an arrow A2, the working gas is recovered from the regenerator 16 to the compressor suction port 12b through the main exhaust path 32b. Moreover, the main intake on/off valve V1 and the main exhaust on/off valve V2 may be temporarily closed together.

The pulse tube cryocooler 10 includes an auxiliary piping system 34 which connects the pulse tube outlet end 18b to the compressor 12. The auxiliary piping system 34, together with the main piping system 32, forms a circulation path of the working gas including the compressor 12, the regenerator 16, and the pulse tube 18.

The auxiliary piping system 34 includes an auxiliary supply path 34a which connects the compressor discharge port 12a to the pulse tube outlet end 18b, and an auxiliary exhaust path 34b which connects the compressor suction port 12b to the pulse tube outlet end 18b. The auxiliary supply path 34a branches off from the main supply path 32a at the supply branch point 32e. The auxiliary exhaust path 34b joins the main exhaust path 32b at the exhaust junction 32f.

In addition, the auxiliary piping system 34 includes an auxiliary bidirectional flow path 34c which is a portion of the auxiliary supply path 34a and a portion of the auxiliary exhaust path 34b, and a connection point 34d which is located between the auxiliary pressure switching valve 20 and the pulse tube outlet end 18b. The auxiliary supply path 34a joins the auxiliary exhaust path 34b at the connection point 34d. The auxiliary bidirectional flow path 34c extends from the connection point 34d to the pulse tube outlet end 18b.

The flow rate adjustment element 21 is configured to adjust a phase of a gas piston generated in the pulse tube 18. In addition, the flow rate adjustment element 21 is configured to adjust a direct current component of a circulation gas flow in the above-described circulate path. For example, the flow rate adjustment element 21 is a variable or fixed orifice, or a needle valve. The flow rate adjustment element 21 is disposed in the auxiliary piping system 34, specifically, in the auxiliary bidirectional flow path 34c.

The auxiliary pressure switching valve 20 is disposed in the auxiliary piping system 34. The auxiliary pressure switching valve 20 is configured to allow the pulse tube outlet end 18b to selectively communicate with the compressor discharge port 12a or the compressor suction port 12b so that a gas displacement oscillation having a phase delay with respect to the pressure oscillation of the working gas is applied to the pulse tube 18.

The auxiliary pressure switching valve 20 has an auxiliary intake on/off valve V3 and an auxiliary exhaust on/off valve V4. The auxiliary intake on/off valve V3 is disposed in the auxiliary supply path 34a between the supply branch point 32e and the connection point 34d. The auxiliary exhaust on/off valve V4 is disposed in the auxiliary exhaust path 34b between the exhaust junction 32f and the connection point 34d.

The auxiliary pressure switching valve 20 is configured such that the auxiliary intake on/off valve V3 and the auxiliary exhaust on/off valve V4 are respectively opened exclusively. That is, simultaneous opening of the auxiliary intake on/off valve V3 and the auxiliary exhaust on/off valve V4 is prohibited. When the auxiliary intake on/off valve V3 is open, the auxiliary exhaust on/off valve V4 is closed. As shown by an arrow A3, the working gas is supplied from the compressor discharge port 12a to the pulse tube 18 through the auxiliary supply path 34a. Meanwhile, when the auxiliary exhaust on/off valve V4 is open, the auxiliary intake on/off valve V3 is closed. As shown by an arrow A4, the working gas is recovered from the pulse tube 18 to the compressor suction port 12b through the auxiliary exhaust path 34b. In addition, the auxiliary intake on/off valve V3 and the auxiliary exhaust on/off valve V4 may be temporarily closed together.

In this way, the pulse tube cryocooler 10 has a group of valves including the main intake on/off valve V1 which connects the regenerator high-temperature end (that is, regenerator inlet end 16a) to the compressor discharge port 12a, the main exhaust on/off valve V2 which connects the regenerator high-temperature end to the compressor suction port 12b, the auxiliary intake on/off valve V3 which connects the pulse tube high-temperature end (that is, pulse tube outlet end 18b) to the compressor discharge port 12a, and the auxiliary exhaust on/off valve which connects the pulse tube high-temperature end to the compressor suction port 12b. This group of valves alternately connects the regenerator high-temperature end to the compressor discharge port 12a and the compressor suction port 12b to generate a working gas pressure oscillation in the pulse tube 18, and is connected to the pulse tube high-temperature end to control the phase delay of the working gas displacement oscillation in the pulse tube 18 with respect to the working gas pressure oscillation. This group of valves is switched in the same cycle during the operation of the pulse tube cryocooler 10, and thus, on/off states of the four on/off valves (V1 to V4) are changed periodically. The four on/off valves (V1 to V4) are opened and closed in different phases.

Moreover, this group of valves (V1 to V4) can be operated according to a cooling valve timing for cooling the pulse tube cryocooler 10 or according to a heating valve timing for heating the pulse tube cryocooler 10, which will be described in detail later.

The group of valves (V1 to V4) described above may have forms of rotary valves. That is, the group of valves (V1 to V4) may be configured such that the valves (V1 to V4) are appropriately switched by rotational sliding of a valve disk (or valve rotor) with respect to a valve body (or valve stator). Accordingly, the main pressure switching valve 14 and the auxiliary pressure switching valve 20 may be driven in synchronization with each other. In this case, the pulse tube cryocooler 10 includes a reversible motor 38 connected to the rotary valve 36 to rotate the rotary valve 36 around the rotary valve rotation axis. The reversible motor 38 is mechanically connected to the rotary valve 36. The rotary valve 36 is configured to be operated according to the cooling valve timing when the reversible motor 38 rotates forward, and to be operated according to the heating valve timing when the reversible motor 38 rotates backward.

The pulse tube cryocooler 10 may include a motor control unit 40 which controls a rotation direction of the reversible motor 38. The motor control unit 40 may be configured to switch the rotation direction of the reversible motor 38 according to an input by a user. For example, the motor control unit 40 may include a changeover switch operated by the user. A rotation direction of the reversible motor 38 is reversed (switched from forward rotation to backward rotation or backward rotation to forward rotation) by an operation of the changeover switch.

A rotary valve unit for the pulse tube cryocooler 10 includes the rotary valve 36 and the reversible motor 38. The rotary valve unit may include the motor control unit 40. The rotary valve unit may be integrally mounted on a cold head (a structure including the regenerator 16 and the pulse tube 18) of the pulse tube cryocooler 10. Alternatively, the rotary valve unit may be provided separately from the cold head and connected to the cold head (regenerator 16 and pulse tube 18) by a pipe.

Figure 2:
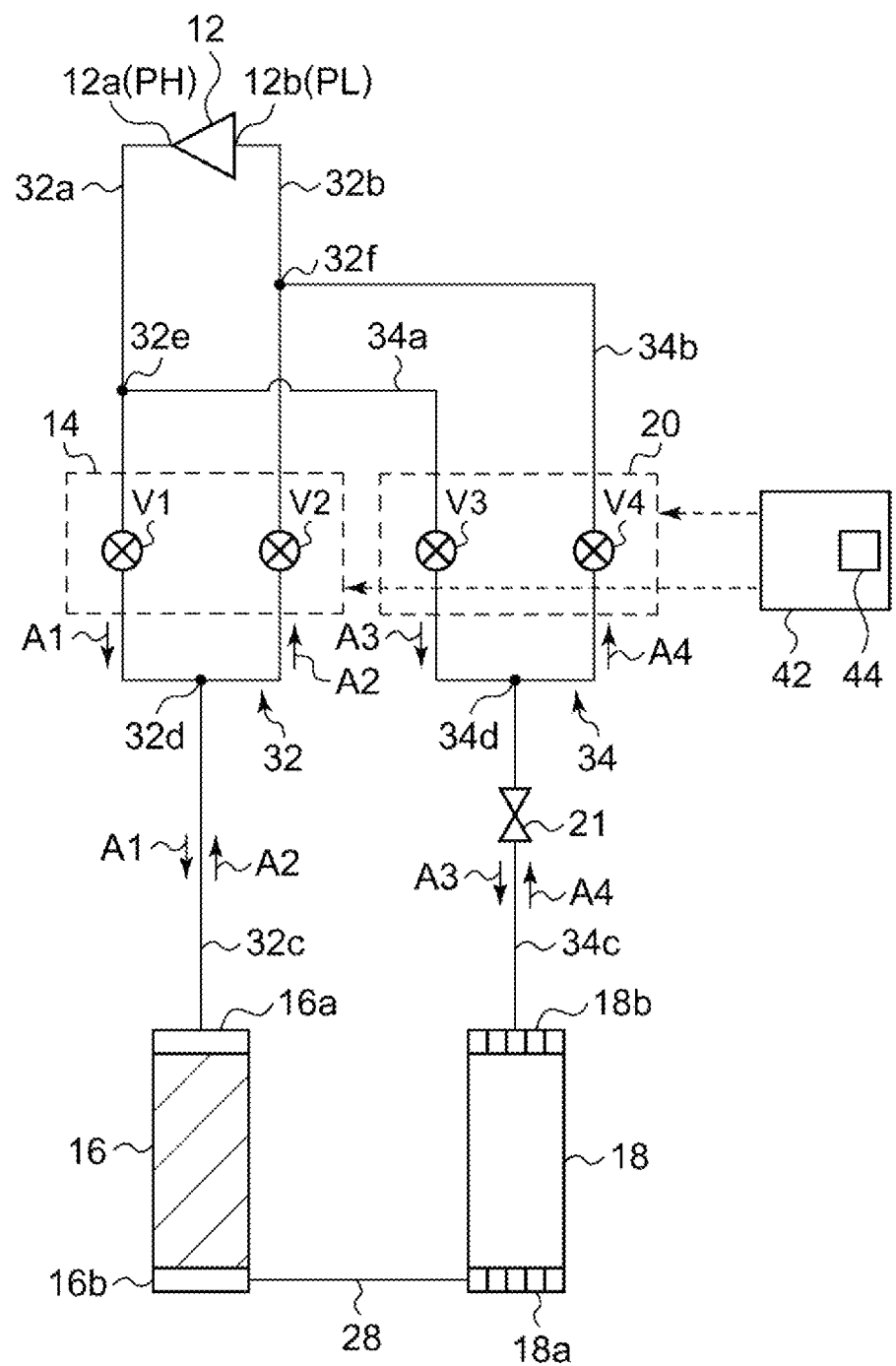
FIG. 2 is a diagram schematically showing a pulse tube cryocooler according to another embodiment.

FIG. 2 a diagram schematically showing a pulse tube cryocooler 10 according to another embodiment. The pulse tube cryocooler 10 shown in FIG. 2 has configurations similar to those of the pulse tube cryocooler 10 shown in FIG. 1 except for a valve configuration.

The group of valves (V1-V4) in the pulse tube cryocooler 10 may have a form of a plurality of individually controllable valves. Each of the valves (V1 to V4) may be a solenoid on/off valve. The group of valves (V1 to V4) can be operated according to the cooling valve timing for cooling the pulse tube cryocooler 10 or according to the heating valve timing for heating the pulse tube cryocooler 10.

Instead of the reversible motor 38 and the motor control unit 40 shown in FIG. 1, the pulse tube cryocooler 10 shown in FIG. 2 includes a valve control unit 42 which controls opening and closing of each of the group of valves (V1 to V4). Each of the valves (V1 to V4) is electrically connected to the valve control unit 42. The group of valves (V1 to V4) is operated at any one of the cooling valve timing or the heating valve timing under the control of the valve control unit 42.

The valve control unit 42 includes a switching device 44 which is configured to perform switching between the cooling valve timing and the heating valve timing. The switching device 44 may be configured to perform between switching the cooling valve timing and the heating valve timing according to an input by the user. For example, the switching device 44 may include a changeover switch operated by the user. One of the two valve timings is changed to the other by the operation of this changeover switch.

In the configurations shown in FIGS. 1 and 2, the main intake on/off valve V1 is configured to be opened at a predetermined main intake start timing and closed at a main intake end timing. The main exhaust on/off valve V2 is configured to open at a predetermined main exhaust start timing and to close at a main exhaust end timing. The auxiliary intake on/off valve V3 is configured to be opened at a predetermined auxiliary intake start timing and closed at an auxiliary intake end timing. The auxiliary exhaust on/off valve V4 is configured to be opened at a predetermined auxiliary exhaust start timing and closed at an auxiliary exhaust end timing.

The cooling valve timing is designed to generate the working gas pressure oscillation in the pulse tube 18 and to apply a first phase delay to the working gas displacement oscillation in the pulse tube 18 with respect to the working gas pressure oscillation. Accordingly, for example, the auxiliary pressure switching valve 20 is configured such that the auxiliary intake on/off valve V3 is opened before the main intake on/off valve V1 is opened and closed before the auxiliary exhaust on/off valve V4 is opened. The auxiliary intake on/off valve V3 may be closed before the main intake on/off valve V1 is closed or may be closed simultaneously with the main intake on/off valve V1. In addition, the auxiliary pressure switching valve 20 is configured so that the auxiliary exhaust on/off valve V4 is opened before the main exhaust on/off valve V2 is opened and closed before the auxiliary intake on/off valve V3 is opened. The auxiliary exhaust on/off valve V4 may be closed before the main exhaust on/off valve V2 is closed or may be closed simultaneously with the main exhaust on/off valve V2.

The first phase delay of the cooling valve timing is determined based on an opening/closing operation timing of each of the valves (V1 to V4). The first phase delay is determined mainly based on a phase difference between the main intake start timing and the auxiliary intake start timing and/or a phase difference between the main exhaust start timing and the auxiliary exhaust start timing.

In the cooling valve timing, for example, the auxiliary intake start timing may be earlier than the main intake start timing by a phase (for example, about 20°) selected from a range of 0° to 40°. Similarly, for example, the auxiliary exhaust start timing may be earlier than the main exhaust start timing by a phase (for example, about 20°) selected from the range of 0° to 40°.

The heating valve timing is designed to generate the working gas pressure oscillation in the pulse tube 18 and to apply a second phase delay to the working gas displacement oscillation in the pulse tube 18 with respect to the working gas pressure oscillation. Accordingly, for example, the auxiliary pressure switching valve 20 is configured such that the auxiliary exhaust on/off valve V4 is opened before the main intake on/off valve V1 is opened and closed before the auxiliary intake on/off valve V3 is opened. The auxiliary exhaust on/off valve V4 may be closed before the main intake on/off valve V1 is closed or may be closed simultaneously with the main intake on/off valve V1. In addition, the auxiliary pressure switching valve 20 is configured such that the auxiliary intake on/off valve V3 is opened before the main exhaust on/off valve V2 is opened and closed before the auxiliary exhaust on/off valve V4 is opened. The auxiliary intake on/off valve V3 may be closed before the main exhaust on/off valve V2 is closed or may be closed simultaneously with the main exhaust on/off valve V2.

The second phase delay of the heating valve timing is determined based on the opening/closing operation timing of each of the valves (V1 to V4). The second phase delay is determined mainly based on a phase difference between the main intake start timing and the auxiliary exhaust start timing and/or a phase difference between the main exhaust start timing and the auxiliary intake start timing.

In the heating valve timing, for example, the auxiliary exhaust start timing may be earlier than the main intake start timing by a phase (for example, about 20°) selected from a range of 0° to 40°. Similarly, for example, the auxiliary intake start timing may be earlier than the main exhaust start timing by a phase (for example, about 20°) selected from the range of 0° to 40°.

The second phase delay is different from the first phase delay. Here, the phase difference between the first phase delay and the second phase delay is more important than a value of each of the first phase delay and the second phase delay. In general, the first phase delay is set such that the pulse tube cryocooler 10 has an optimal refrigeration performance. The second phase delay may be shifted by a phase difference selected from the range of 120° to 240° with respect to the optimal first phase delay. The second phase delay may be shifted from the first phase delay by a phase difference selected from the range of 150° to 210°. The second phase delay may be shifted by about 180° from the first phase delay.

In this way, when the pulse tube cryocooler 10 is operated at the heating valve timing, a heating cycle is formed, and the temperature of the pulse tube cryocooler 10 can increase based on the compression heat of the working gas. An example of the operation of the pulse tube cryocooler 10 will be further described below.

The operation of the pulse tube cryocooler 10 having the above configuration will be described with reference to FIGS. 3A to 5B.

Figure 3A:
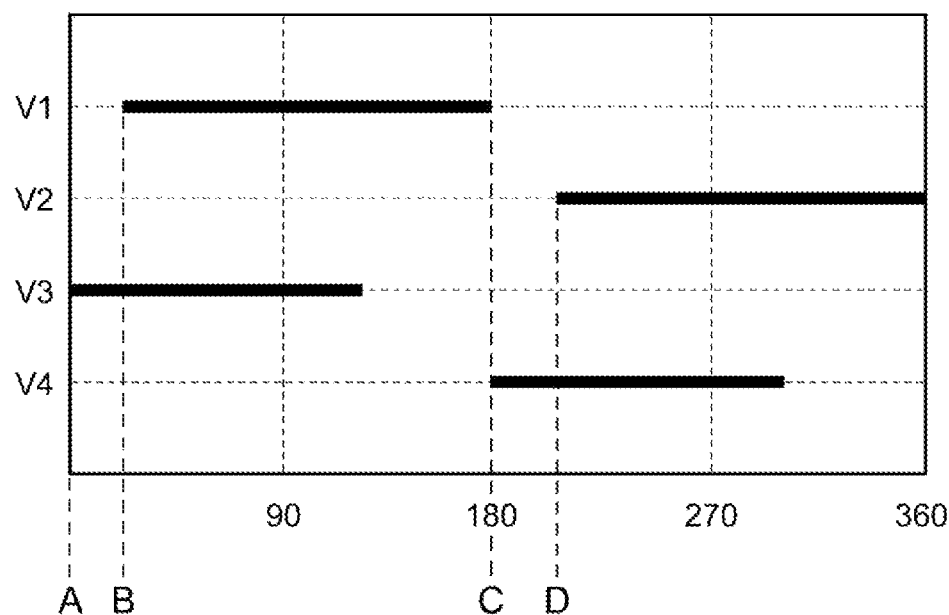
FIGS. 3A and 3B are diagrams showing timing charts of the pulse tube cryocooler according to the embodiment.
Figure 3B:
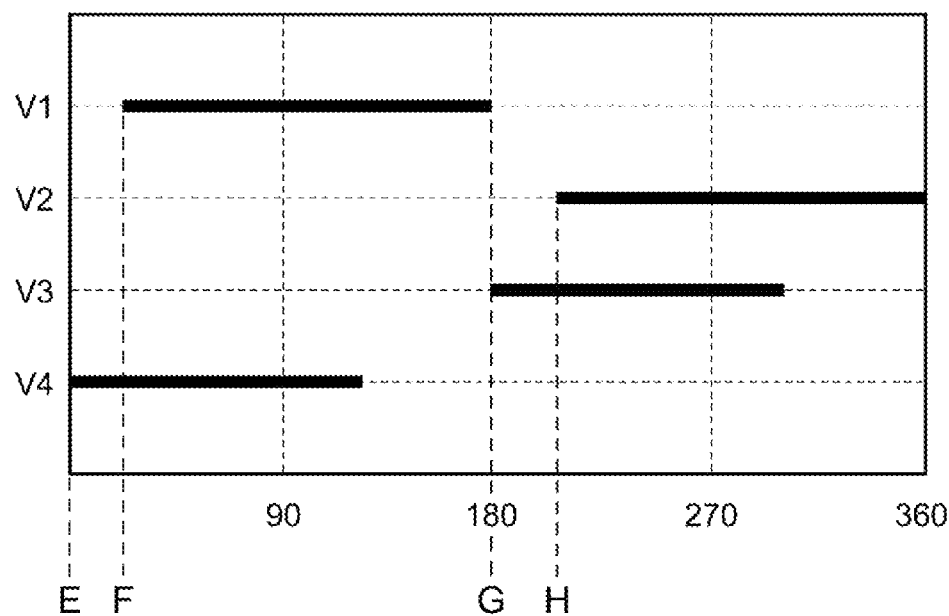

FIGS. 3A and 3B are diagrams showing timing charts of the pulse tube cryocooler according to the embodiment. FIG. 3A shows an example of the cooling valve timing, and FIG. 3B shows an example of the heating valve timing. In FIGS. 3A and 3B, the valve on/off state of the pulse tube cryocooler 10 is shown in time series over one cycle. One cycle is associated with 360°. The shown timing chart can be applied to the pulse tube cryocooler 10 shown in FIGS. 1 and 2.

Figure 4A:
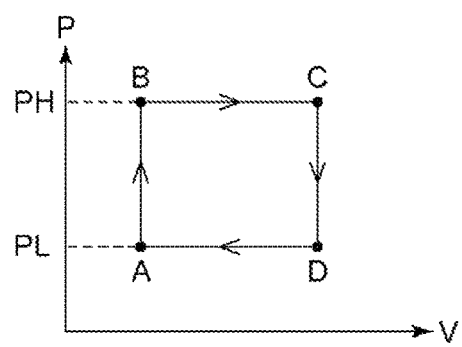
FIG. 4A shows a PV diagram of a cooling valve timing shown in FIG. 3A.
Figure 4B:
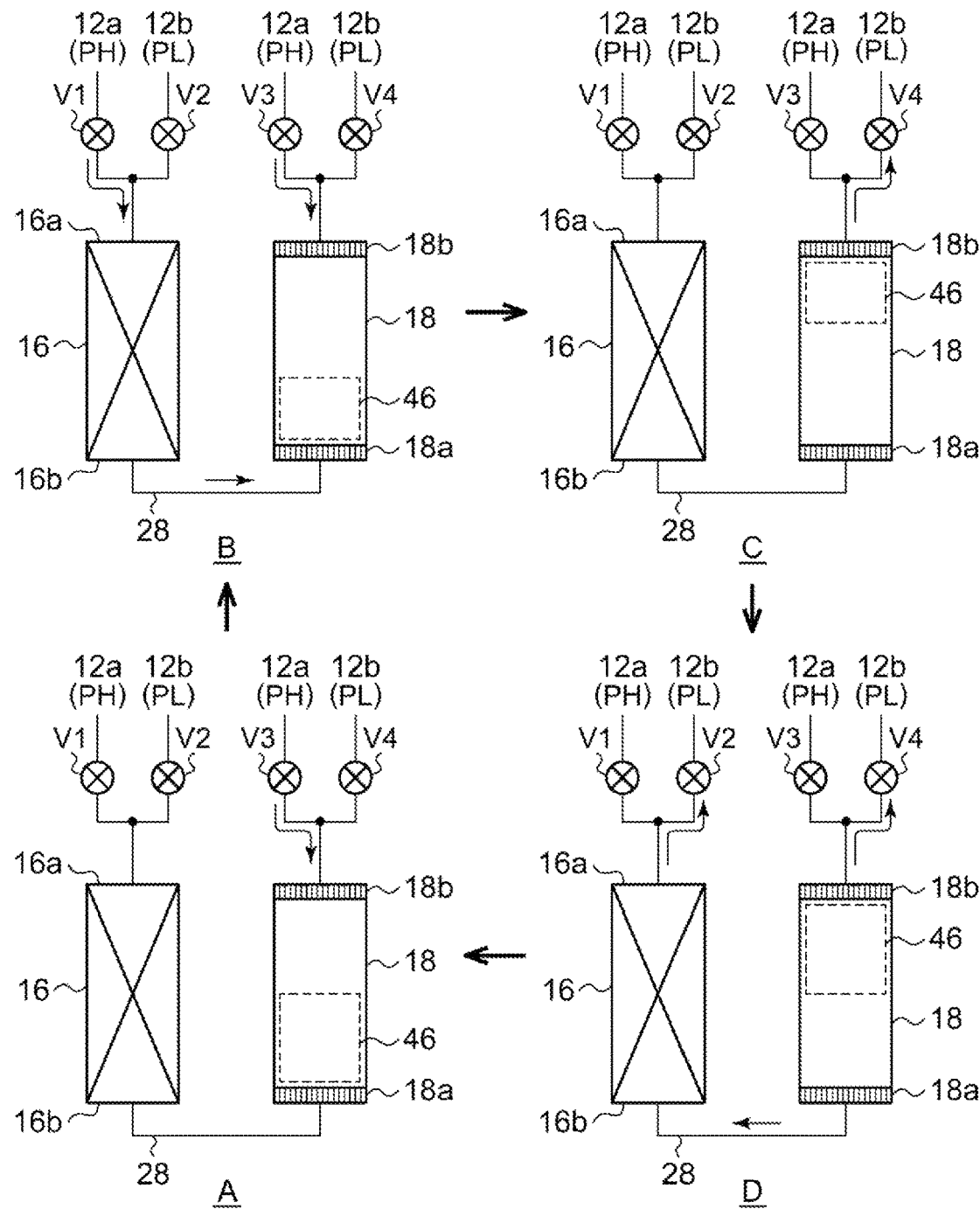
FIG. 4B shows an operation of the pulse tube cryocooler.
Figure 5A:
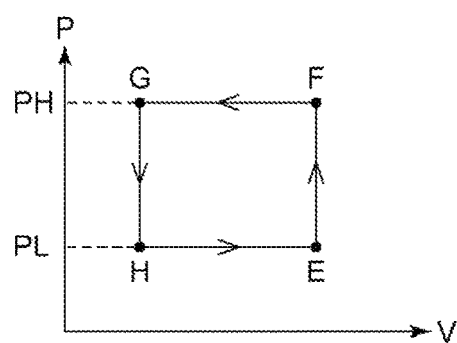
FIG. 5A shows a PV diagram of a heating valve timing shown in FIG. 3B.
Figure 5B:
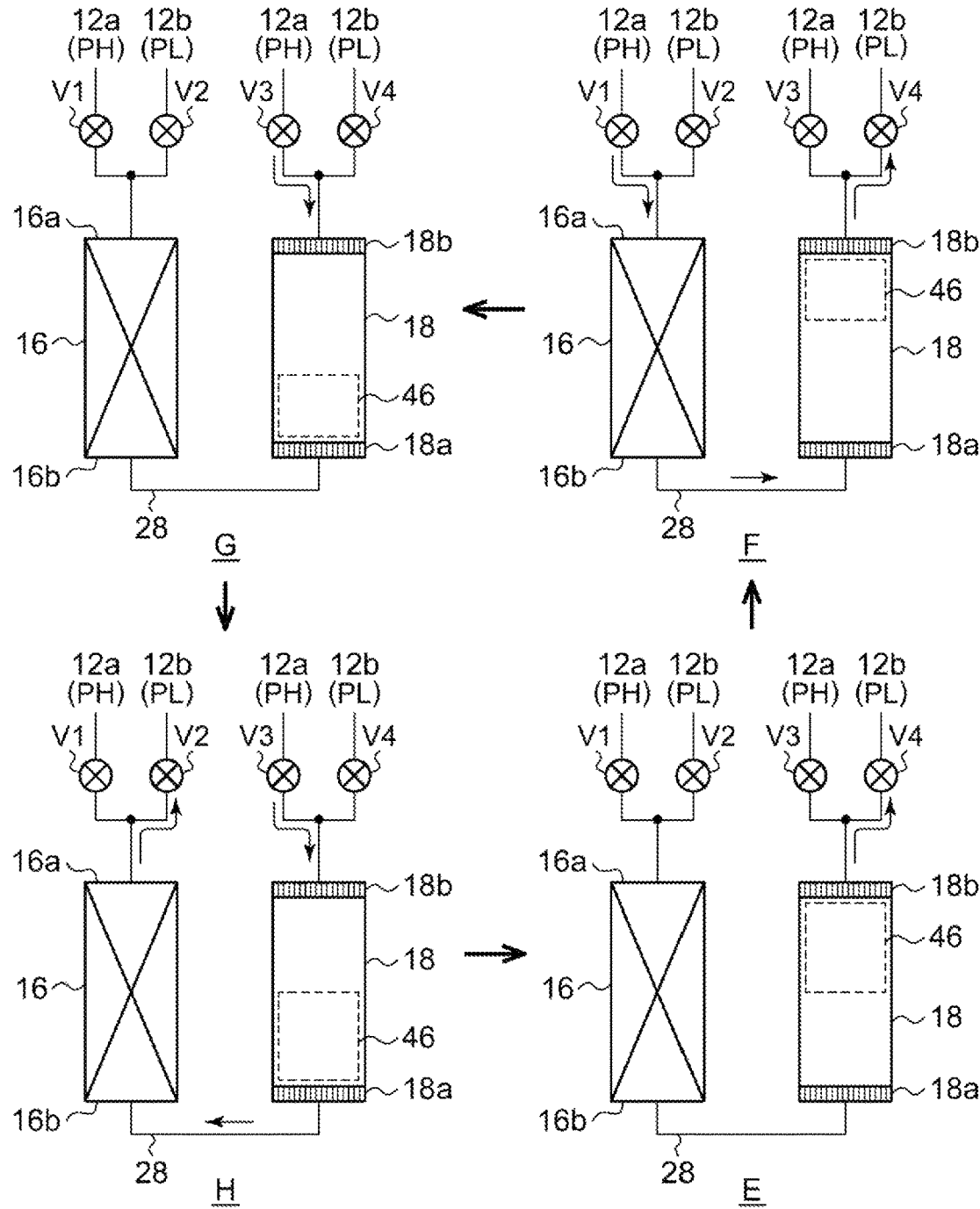
FIG. 5B is the operation of the pulse tube cryocooler.

In addition, FIG. 4A shows a PV diagram of the cooling valve timing shown in FIG. 3A, and FIG. 4B shows the operation of the pulse tube cryocooler. FIG. 5A shows a PV diagram of the heating valve timing shown in FIG. 3B, and FIG. 5B shows the operation of the pulse tube cryocooler. A movement of the working gas, which moves periodically up and down in the pulse tube while holding a pressure, is often referred to as a "gas piston" and is often used to explain the operation of the pulse tube cryocooler. In FIG. 4B and FIG. 5B, a gas piston 46 is shown by dashed lines in the pulse tube 18.

At the cooling valve timing, first, a high-pressure working gas from the compressor 12 starts to be supplied to a high-temperature end of the pulse tube 18. A point A shown in FIG. 3A, FIG. 4A, and FIG. 4B corresponds to the above-described auxiliary intake start timing. The inside of the pulse tube 18 is in a state of the low-pressure (PL). The auxiliary intake on/off valve V3 is opened at the point A, and a high-pressure working gas flows into the pulse tube outlet end 18b from the compressor discharge port 12a through the auxiliary intake on/off valve V3. Accordingly, the gas piston 46 moves to a low-temperature end of the pulse tube 18. A volume on a side of the pulse tube inlet end 18a with respect to the gas piston 46 is reduced. Further, a pressure on the pulse tube inlet end 18a side with respect to the gas piston 46 is the low-pressure (PL).

Subsequently, the high-pressure working gas is supplied to the pulse tube 18 through the regenerator 16. The main intake on/off valve V1 is opened at a point B corresponding to the main intake start timing, and thus, the high-pressure working gas flows from the compressor discharge port 12a into the regenerator inlet end 16a through the main intake on/off valve V1. The gas is precooled by the regenerator 16 and flows from the regenerator outlet end 16b into the pulse tube inlet end 18a through the communication passage 28. The pressure inside the pulse tube 18 is increased to the high-pressure (PH), and thus, the gas piston 46 is slightly contracted at the low-temperature end of the pulse tube 18. Thereafter, as shown in FIG. 3A, the auxiliary intake on/off valve V3 is closed, and subsequently, the main intake on/off valve V1 is closed.

Next, the gas start to be recovered from the pulse tube 18 to the compressor 12. The auxiliary exhaust on/off valve V4 is opened at a point C corresponding to the auxiliary exhaust start timing, and gas flows out from the pulse tube outlet end 18b to the compressor suction port 12b through the auxiliary exhaust on/off valve V4. Accordingly, the gas piston 46 moves to the high-temperature end of the pulse tube 18. A volume on a side of the pulse tube inlet end 18a with respect to the gas piston 46 is expanded. The inside of the pulse tube 18 is in a state of the high-pressure (PH).

Subsequently, the gas is recovered from the pulse tube 18 through the regenerator 16 to the compressor 12. The main exhaust on/off valve V2 is opened at a point D corresponding to the main exhaust start timing, and the gas is expanded in the pulse tube 18 to generate cold. The cooled gas returns from the pulse tube 18 to the regenerator 16 to cool the regenerator 16. The pressure in the pulse tube 18 is reduced to the low-pressure (PL), and thus, the gas piston 46 expands slightly at the high-temperature end of the pulse tube 18. Thereafter, as shown in FIG. 3A, the auxiliary exhaust on/off valve V4 is closed, and subsequently, the main exhaust on/off valve V2 is closed.

In this way, when the pulse tube cryocooler 10 is operated according to the cooling valve timing, high-pressure (PH) and low-pressure (PL) working gas pressure oscillations are generated in the pulse tube 18. In the pulse tube 18, a displacement oscillation of the working gas, that is, a reciprocation of the gas piston 46, is generated with the first phase delay in synchronization with the pressure oscillation. When the gas piston 46 is located at the high-temperature end of the pulse tube 18, the working gas expands at the low-temperature end of the pulse tube 18, and the cold is generated.

By repeating such a refrigeration cycle, the pulse tube cryocooler 10 cools the low-temperature end of the pulse tube 18. Accordingly, the pulse tube cryocooler 10 can cool an object thermally coupled to the low-temperature end of the pulse tube 18.

Meanwhile, in the exemplified heating valve timing, an intake/exhaust timing by the auxiliary intake on/off valve V3 and the auxiliary exhaust on/off valve V4 is inverted (that is, 180° shifted) from an intake/exhaust timing by the auxiliary intake on/off valve V3 and the auxiliary exhaust on/off valve V4 at the cooling valve timing.

First, the gas is recovered to the compressor 12 from the high-temperature end of the pulse tube 18. The auxiliary exhaust on/off valve V4 is opened and the gas flows out from the pulse tube outlet end 18b to the compressor suction port 12b through the auxiliary exhaust on/off valve V4 at a point E (FIG. 3B and FIGS. 5A and 5B) corresponding to the auxiliary exhaust start timing. Accordingly, the gas piston 46 moves to the high-temperature end of the pulse tube 18. The volume on the side of the pulse tube inlet end 18a with respect to the gas piston 46 is expanded. The inside of the pulse tube 18 is in a state of the low-pressure (PL).

Subsequently, the high-pressure working gas is supplied to the pulse tube 18 through the regenerator 16. The main intake on/off valve V1 is opened at a point F corresponding to the main intake start timing, and thus, the high-pressure working gas flows from the compressor discharge port 12a into the regenerator inlet end 16a through the main intake on/off valve V1. The gas flows from the regenerator outlet end 16b into the pulse tube inlet end 18a through the communication passage 28 while warming the regenerator 16. The pressure inside the pulse tube 18 is increased to the high-pressure (PH), and in this case, an adiabatic compression of the working gas is generated in the pulse tube 18, and compression heat is generated. The pressure inside the pulse tube 18 increases, and thus, the gas piston 46 is slightly contracted at the high-temperature end of the pulse tube 18. Thereafter, as shown in FIG. 3B, the auxiliary exhaust on/off valve V4 is closed, and subsequently, the main intake on/off valve V1 is closed.

Next, the high-pressure working gas is supplied from the compressor 12 to the high-temperature end of the pulse tube 18. The auxiliary intake on/off valve V3 is opened at a point G corresponding to the auxiliary intake start timing, and the high-pressure working gas flows from the compressor discharge port 12a into the pulse tube outlet end 18b through the auxiliary intake on/off valve V3. Accordingly, the gas piston 46 moves to the low-temperature end of the pulse tube 18. The volume on the side of the pulse tube inlet end 18a with respect to the gas piston 46 is reduced. The inside of the pulse tube 18 is in the state of high-pressure (PH).

Subsequently, the gas is recovered from the pulse tube 18 to the compressor 12 through the regenerator 16. The main exhaust on/off valve V2 is opened at an H point corresponding to the main exhaust start timing, and the heated gas is returned from the pulse tube inlet end 18a to the regenerator 16 through the communication passage 28 and increase the temperature of the regenerator 16. The pressure inside the pulse tube 18 is reduced to the low-pressure (PL), and thus, the gas piston 46 expands slightly at the low-temperature end of the pulse tube 18. Thereafter, as shown in FIG. 3B, the auxiliary intake on/off valve V3 is closed, and subsequently, the main exhaust on/off valve V2 is closed.

In this way, when the pulse tube cryocooler 10 is operated according to the heating valve timing, the high-pressure (PH) and low-pressure (PL) working gas pressure oscillations are generated in the pulse tube 18. In the pulse tube 18, the displacement oscillation of the working gas, that is, the reciprocation of the gas piston 46, is generated with the second phase delay in synchronization with the pressure oscillation. The second phase delay is shifted by about 180° with respect to the first phase delay. When the gas piston 46 is located at the high-temperature end of the pulse tube 18, the working gas is compressed at the low-temperature end of the pulse tube 18, and heat is generated.

By repeating such a temperature rising cycle, the pulse tube cryocooler 10 can increase the temperature of the low-temperature end of the pulse tube 18. Accordingly, the pulse tube cryocooler 10 can heat the object thermally coupled to the low-temperature end of the pulse tube 18.

In this way, according to the pulse tube cryocooler 10 of the embodiment, when the group of valves (preferably, embodied as one rotary valve) is operated at the cooling valve timing, the displacement oscillation with respect to the pressure oscillation of the working gas in the pulse tube 18 has the first phase delay. Accordingly, the refrigeration cycle is formed in the pulse tube cryocooler 10, and the pulse tube cryocooler 10 is cooled. In addition, the second phase delay associated with the heating valve timing is shifted by the phase difference (that is, about 180°) selected from the range of 120° to 240° from the first phase delay. If the phase shift is applied to operate the group of valves at the heating valve timing, the temperature rising cycle is formed in the pulse tube cryocooler 10, and the temperature of the pulse tube cryocooler 10 can increase based on the compression heat of the working gas.

Since the compression heat of the working gas is used, it is possible to effectively increase the temperature of pulse tube cryocooler 10 in a short time as compared with the known method in which the working gas constantly flows in one direction from the pulse tube to the regenerator. In addition, the temperature of the pulse tube cryocooler 10 can increase to a temperature higher than the room temperature without addition of the heating element such as the electric heater.

Next, an exemplary configuration of the rotary valve 36 of the pulse tube cryocooler 10 shown in FIG. 1 will be described. The rotary valve 36 is configured to be operated according to the cooling valve timing when the reversible motor 38 rotates forward, and to be operated according to the heating valve timing when the reversible motor 38 rotates backward.

Figure 6:
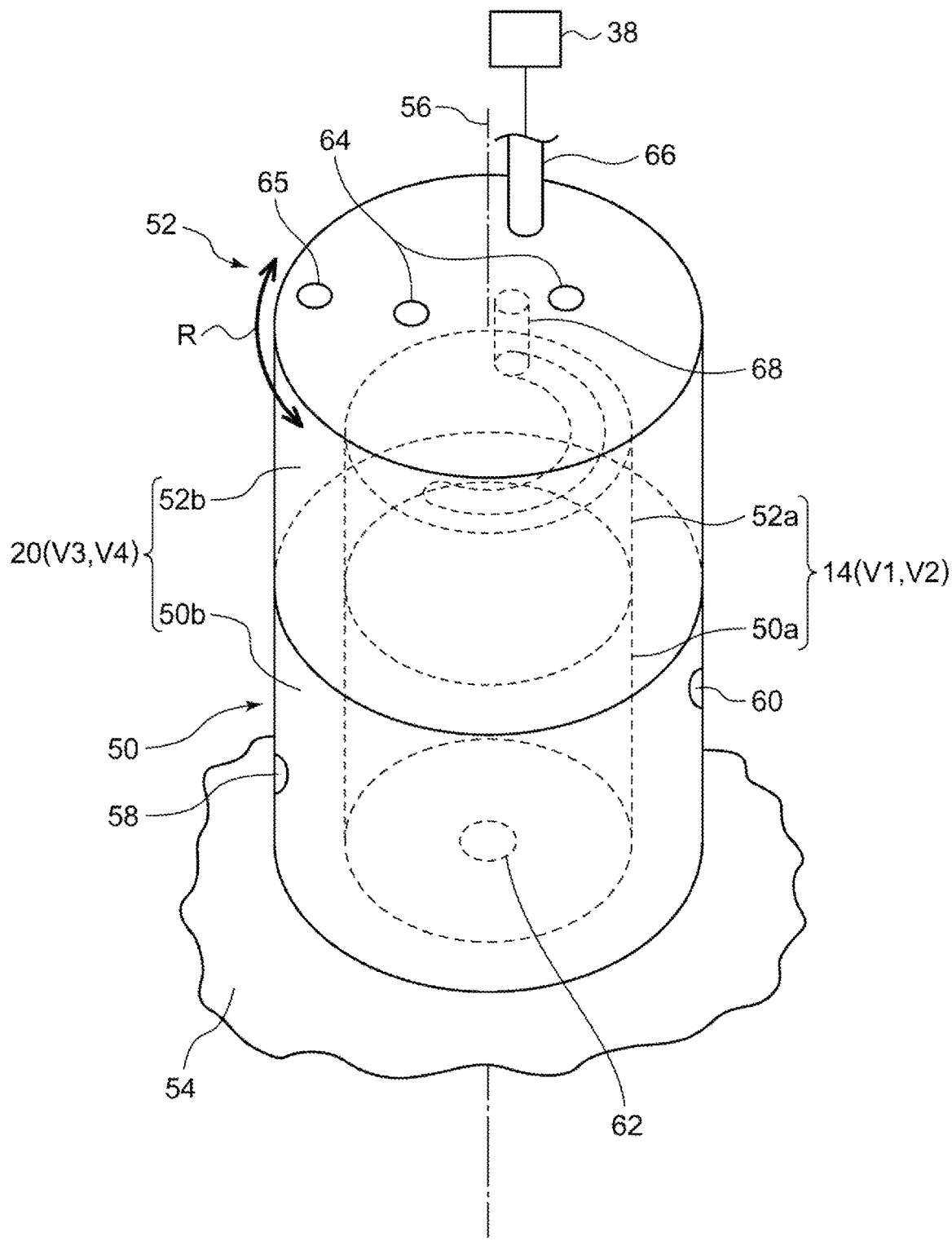
FIG. 6 is a schematic perspective diagram showing a rotary valve unit for a pulse tube cryocooler according to the embodiment.

FIG. 6 is a schematic perspective diagram showing the rotary valve unit for the pulse tube cryocooler according to the embodiment. For ease of understanding, a portion of an internal structure is indicated by dashed lines.

The rotary valve 36 includes a valve stator 50 and a valve rotor 52. The valve stator 50 is fixed to a valve housing 54 which accommodates the rotary valve 36 or other stationary portions. The valve housing 54 may be integrally fixed (that is, may be mounted on the cold head of the pulse tube cryocooler 10) to the regenerator 16 and the pulse tube 18 shown in FIG. 1 or may be provided to be separated from the regenerator 16 and the pulse tube 18.

The valve stator 50 includes a first valve stator 50a and a second valve stator 50b. The first valve stator 50a and the second valve stator 50b are together fixed to the valve housing 54. The first valve stator 50a and the second valve stator 50b are formed in a cylindrical shape and are disposed coaxially with a rotary valve rotation axis (hereinafter, also referred to as a valve rotation axis) 56. The second valve stator 50b is disposed outside the first valve stator 50a so as to surround the first valve stator 50a. An inner cylindrical surface of the second valve stator 50b is in contact with an outer cylindrical surface of the first valve stator 50a.

In this way, the valve stator 50 is divided into two stator parts. However, this division is not essential, and the valve stator 50 may be a single part.

The valve stator 50 has a regenerator port 58 and a pulse tube port 60. The rotary valve 36 is connected to the regenerator inlet end 16a shown in FIG. 1 through the regenerator port 58 and is in fluid communication with the regenerator 16. The regenerator port 58 corresponds to the main bidirectional flow path 32c shown in FIG. 1. In addition, the rotary valve 36 is connected to the pulse tube outlet end 18b shown in FIG. 1 through the pulse tube port 60 and in fluid communication with the pulse tube 18. The pulse tube port 60 corresponds to auxiliary bidirectional flow path 34c shown in FIG. 1.

The regenerator port 58 and the pulse tube port 60 are open on a cylindrical side surface of the second valve stator 50b. The regenerator port 58 and the pulse tube port 60 are disposed on sides opposite to each other across the valve rotation axis 56. The regenerator port 58 penetrates contact surfaces of the first valve stator 50a and the second valve stator 50b from the second valve stator 50b to the first valve stator 50a. The regenerator port 58 and the pulse tube port 60 are located at different positions in a direction of the valve rotation axis 56 in order to seal the regenerator port 58 and the pulse tube port 60 to each other by a sealing member such as an O-ring on the contact surface between the second valve stator 50b and the first valve stator 50a.

Moreover, the valve stator 50 also has a high-pressure port 62. The rotary valve 36 is connected to the compressor discharge port 12a shown in FIG. 1 through the high-pressure port 62 and is in fluid communication with the compressor 12. The high-pressure port 62 corresponds to the main supply path 32a shown in FIG. 1. The high-pressure port 62 is open on a bottom surface (that is, a surface on aside opposite to the valve rotor 52 in the direction of the valve rotation axis 56) of the first valve stator 50a.

The valve rotor 52 is connected to the reversible motor 38 so as to rotate with respect to the valve stator 50 around the valve rotation axis 56. For example, the valve rotor 52 is connected to an output shaft of the reversible motor 38 via a rotation transmission mechanism 66 such as a crank mechanism on one end side in the direction of the valve rotation axis 56. The valve rotor 52 may be directly connected to the output shaft of the reversible motor 38. The valve rotor 52 is rotatable in both forward and backward directions around the valve rotation axis 56 as indicated by an arrow R.

Further, the valve rotor 52 is in surface contact with the valve stator 50 so as to rotationally slide with respect to the valve stator 50 on the other end side in the direction of the valve rotation axis 56. The surface contact between the valve rotor 52 and the valve stator 50 maintains air tightness of the working gas flowing through the valve stator 50 and the valve rotor 52. In other words, a high-pressure gas flow path and a low-pressure gas flow path penetrating a rotation sliding surface of the valve rotor 52 and the valve stator 50 are sealed to each other by a contact surface pressure between the valve rotor 52 and the valve stator 50.

The valve rotor 52 includes a first valve rotor 52a and a second valve rotor 52b. The first valve rotor 52a and the second valve rotor 52b are connected to the reversible motor 38 so as to rotate with respect to the valve stator 50 around the valve rotation axis 56. The first valve rotor 52a is configured to alternately connect the regenerator high-temperature end to the compressor discharge port and the compressor suction port by a rotation. The second valve rotor 52b is configured to alternately connect the pulse tube high-temperature end to the compressor discharge port and the compressor suction port by a rotation. A configuration of a flow path inside the rotary valve 36 will be described later.

The first valve rotor 52a and the second valve rotor 52b are formed in a cylindrical shape and are disposed coaxially with the valve rotation axis 56. The second valve rotor 52b is disposed outside the first valve rotor 52a so as to surround the first valve rotor 52a. An inner cylindrical surface of the second valve rotor 52b is in contact with an outer cylindrical surface of the first valve rotor 52a. One end side of the second valve rotor 52b in the direction of the valve rotation axis 56 is closed and the other end side thereof is open, and thus, the second valve rotor 52b has a recess into which the first valve rotor 52a is fitted. An upper surface (the surface on the side opposite to the valve stator 50 in the direction of the valve rotation axis 56) of the first valve rotor 52a is in contact with a closed end portion of the second valve rotor 52b.

In this way, the valve rotor 52 is divided into two rotor parts.

The valve rotor 52 has a main low-pressure port 64 and an auxiliary low-pressure port 65. The rotary valve 36 is connected to the compressor suction port 12b shown in FIG. 1 through the main low-pressure port 64 and the auxiliary low-pressure port 65 and is in fluid communication with the compressor 12. The main low-pressure port 64 corresponds to the main exhaust path 32b shown in FIG. 1. The auxiliary low-pressure port 65 corresponds to the auxiliary exhaust path 34b shown in FIG. 1. The main low-pressure port 64 and the auxiliary low-pressure port 65 are open an upper surface of the second valve rotor 52b. Although the main low-pressure port 64 includes two gas outlets in the drawings, the main low-pressure port 64 may include only one gas outlet.

The first valve rotor 52a is in surface contact with the first valve stator 50a so as to rotationally slide with respect to the first valve stator 50a. An outer diameter of the first valve rotor 52a is the same as an outer diameter of the first valve stator 50a. The second valve rotor 52b is in surface contact with the second valve stator 50b so as to rotationally slide with respect to the second valve stator 50b. An inner diameter and an outer diameter of the second valve rotor 52b are the same as an inner diameter and an outer diameter of the second valve stator 50b. Moreover, the outer diameter of the second valve rotor 52b may be different from the outer diameter of the second valve stator 50b.

A combination of the first valve stator 50a and the first valve rotor 52a constitutes the main pressure switching valve 14 shown in FIG. 1, that is, the main intake on/off valve V1 and the main exhaust on/off valve V2. A combination of the second valve stator 50b and the second valve rotor 52b constitutes the auxiliary pressure switching valve 20 shown in FIG. 1, that is, the auxiliary intake on/off valve V3 and the auxiliary exhaust on/off valve V4.

The first valve rotor 52a and the second valve rotor 52b are connected to each other by a valve rotor connection mechanism 68. The valve rotor connection mechanism 68 connects the first valve rotor 52a and the second valve rotor 52b to each other such that when the reversible motor 38 rotates forward, both valve rotors rotate around the valve rotation axis 56 while the first valve rotor 52a holds a first relative angle relative to the second valve rotor 52b, and when the reversible motor 38 rotates backward, both valve rotors rotate around the valve rotation axis 56 while the first valve rotor 52a holds a second relative angle relative to the second valve rotor 52b. The rotation of the reversible motor 38 is transmitted to the second valve rotor 52b via a rotation transmission mechanism 66 (or directly), and a rotation of the second valve rotor 52b is transmitted to the first valve rotor 52a via the valve rotor connection mechanism 68. In this way, the first valve rotor 52a and the second valve rotor 52b rotate together.

The valve rotor connection mechanism 68 is configured to change a relative position of the first valve rotor 52a and the second valve rotor 52b in accordance with reversal in a rotation direction of the reversible motor 38. More specifically, the valve rotor connection mechanism 68 is configured to perform switching between the first relative angle and the second relative angle in accordance with the reversal in the rotation direction of the reversible motor 38. Details of the valve rotor connection mechanism 68 will be described later.

The second relative angle is different from the first relative angle. The first relative angle is set such that the rotary valve 36 provides the first phase delay of the cooling valve timing. The second relative angle is set such that the rotary valve 36 provides the second phase delay of the heating valve timing. The second relative angle may be shifted from the first relative angle by an angle selected from a range of 120° to 240°. The second relative angle may be shifted from the first relative angle by an angle selected from the range of 150° to 210°. The second relative angle may be shifted by about 180° from the first relative angle.

In this way, it is possible to operate the rotary valve 36 according to the cooling valve timing when the reversible motor 38 rotates forward and operate the rotary valve 36 according to the heating valve timing when the reversible motor 38 rotates backward.

The flow path configuration of the rotary valve 36 will be described with reference to FIGS. 7A to 9B.

FIGS. 7A, 7B, and 7C are schematic plan views showing the rotation sliding surface of the rotary valve unit according to the embodiment. FIG. 7A shows a surface of the valve stator 50 in surface contact with the valve rotor 52, and FIGS. 7B and 7C show a surface of the valve rotor 52 in surface contact with the valve stator 50. FIG. 7B shows a relative position of the first valve rotor 52a and the second valve rotor 52b at the cooling valve timing, and FIG. 7C shows a relative position of the first valve rotor 52a and the second valve rotor 52b at the heating valve timing.

Figures 9A, 9B:
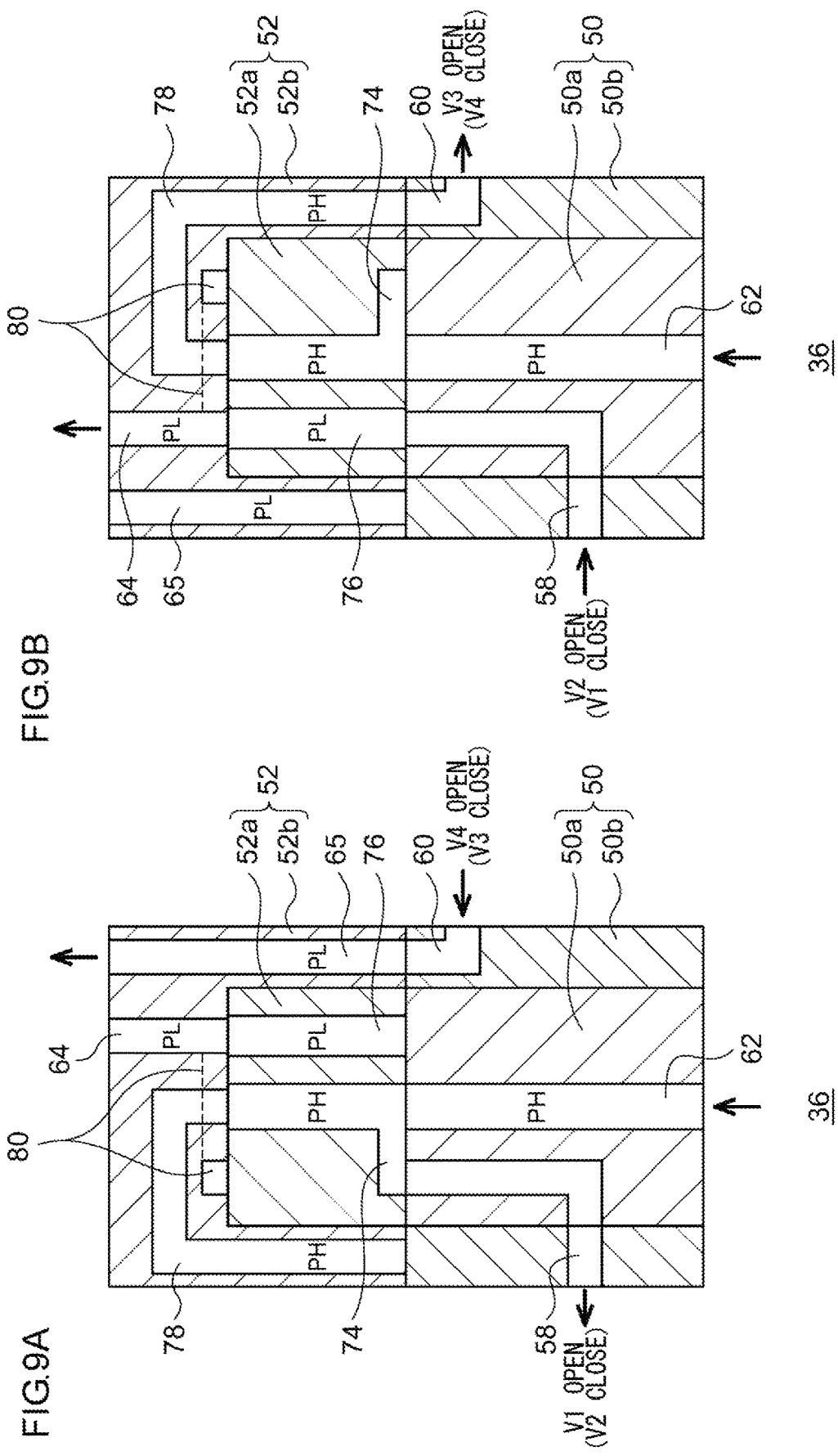
FIGS. 9A and 9B are schematic cross-sectional diagrams of the rotary valve showing the flow path connection at the cooling valve timing.

In addition, FIGS. 8A and 8B are schematic cross-sectional views of the rotary valve 36 showing a flow path connection at the cooling valve timing. FIG. 8A shows a state where the main intake on/off valve V1 and the auxiliary intake on/off valve V3 are open (that is, a state where the main exhaust on/off valve V2 and the auxiliary exhaust on/off valve V4 are closed). FIG. 8B shows a state where the main exhaust on/off valve V2 and the auxiliary exhaust on/off valve V4 are open (that is, a state where the main intake on/off valve V1 and the auxiliary intake on/off valve V3 are closed). FIGS. 9A and 9B are schematic cross-sectional views of the rotary valve 36 showing a flow path connection at the heating valve timing. FIG. 9A shows a state where the main intake on/off valve V1 and the auxiliary exhaust on/off valve V4 are open (that is, a state where the main exhaust on/off valve V2 and the auxiliary intake on/off valve V3 are closed). FIG. 9B shows a state where the main exhaust on/off valve V2 and the auxiliary intake on/off valve V3 are open (that is, a state where the main intake on/off valve V1 and the auxiliary exhaust on/off valve V4 are closed). FIGS. 8A to 9B show cross sections including the valve rotation axis 56.

As shown in FIG. 7A, the first valve stator 50a has a first stator plane 70a, and the second valve stator 50b has a second stator plane 70b. The first stator plane 70a is an end surface of the first valve stator 50a, and the second stator plane 70b is an end surface of the second valve stator 50b. As described above, since the valve stator 50 has a double cylindrical structure in which the first valve stator 50a and the second valve stator 50b respectively are an inner cylinder and an outer cylinder, the first stator plane 70a has a circular region and the second stator plane 70b has an annular region surrounding the first stator plane 70a. The first stator plane 70a and the second stator plane 70b are located at substantially the same height in the direction of the valve rotation axis 56, and thus, the first stator plane 70a and the second stator plane 70b are located on substantially the same plane.

The high-pressure port 62 and the regenerator port 58 are opened on the first stator plane 70a. The high-pressure port 62 is located at a center of the first stator plane 70a. That is, the high-pressure port 62 penetrates the first valve stator 50a in the direction of the valve rotation axis 56. The regenerator port 58 penetrates the first valve stator 50a from an outer peripheral portion of the first stator plane 70a to the cylindrical side surface of the second valve stator 50b. That is, the regenerator port 58 enters the first valve stator 50a in the direction of the valve rotation axis 56, is bent radially outward, and is open on a cylindrical side surface of the first valve stator 50a. In addition, the regenerator port 58 is connected to a hole penetrating the second valve stator 50b in the radial direction.

The pulse tube port 60 is open on the second stator plane 70b. The pulse tube port 60 is located on a side opposite to the regenerator port 58 across the high-pressure port 62 (that is, the valve rotation axis 56). The pulse tube port 60 enters the second valve stator 50b in the direction of the valve rotation axis 56 from the second stator plane 70b, is bent radially outward, and penetrates the cylindrical side surface of the second valve stator 50b.

As shown in FIG. 7B, the first valve rotor 52a has a first rotor plane 72a in surface contact with the first stator plane 70a, and the second valve rotor 52b has a second rotor plane 72b in surface contact with the second stator plane 70b. The first rotor plane 72a is an end surface of the first valve rotor 52a, and the second rotor plane 72b is an end surface of the second valve rotor 52b. As described above, since the valve rotor 52 has a double cylindrical structure in which the first valve rotor 52a and the second valve rotor 52b respectively are an inner cylinder and an outer cylinder, the first rotor plane 72a has a circular region, and the second rotor plane 72b has an annular region surrounding the first rotor plane 72a. The first valve stator 50a and the second valve stator 50b are located at substantially the same height in the direction of the valve rotation axis 56, and thus, the first valve stator 50a and the second valve stator 50b are located on substantially the same plane.

A first rotor high-pressure flow path 74 is open on the first rotor plane 72a. The first rotor high-pressure flow path 74 defines a rectangular or oblong gas inlet extending radially outward from a center portion of the first rotor plane 72a, on the first rotor plane 72a. The gas inlet extends in a radial direction of the first rotor plane 72a. However, the first rotor high-pressure flow path 74 does not reach a cylindrical side surface of the first valve rotor 52a. A radial length of the first rotor high-pressure flow path 74 is approximately equal to a radial length from the high-pressure port 62 on the first stator plane 70a to the regenerator port 58. An outer circumferential portion of the first rotor high-pressure flow path 74 and the regenerator port 58 are located on substantially the same circumference about the valve rotation axis 56.

A central portion of the first rotor high-pressure flow path 74 penetrates from the first rotor plane 72a to an upper surface (an end surface on a side opposite to the first rotor plane 72a) of the first valve rotor 52a in the direction of the valve rotation axis 56 (refer to FIG. 8A). The first rotor high-pressure flow path 74 is always connected to the high-pressure port 62.

In addition, a first rotor low-pressure flow path 76 is opened on the first rotor plane 72a. A radial length from the valve rotation axis 56 to the first rotor low-pressure flow path 76 on the first rotor plane 72a is approximately equal to a radial length from the valve rotation axis 56 to the regenerator port 58 on the first stator plane 70a. The first rotor low-pressure flow path 76 and the regenerator port 58 are located on substantially the same circumference about the valve rotation axis 56. The first rotor low-pressure flow path 76 is located on a side opposite to the first rotor high-pressure flow path 74 with respect to the valve rotation axis 56. The first rotor low-pressure flow path 76 penetrate from the first rotor plane 72a to the upper surface of the first valve rotor 52a in the direction of the valve rotation axis 56 (refer to FIG. 8A).

The auxiliary low-pressure port 65 and a second rotor high-pressure flow path 78 are opened on the second rotor plane 72b. The auxiliary low-pressure port 65, the second rotor high-pressure flow path 78, and the pulse tube port 60 on the second stator plane 70b are located on substantially the same circumference about the valve rotation axis 56. The auxiliary low-pressure port 65 penetrates the second valve rotor 52b up to the upper surface of the second valve rotor 52b in the direction of the valve rotation axis 56. The second rotor high-pressure flow path 78 is bent inside the second valve rotor 52b to reach the first rotor high-pressure flow path 74 (refer to FIG. 8A). The second rotor high-pressure flow path 78 is always connected to the first rotor high-pressure flow path 74 on the upper surface of the first valve rotor 52a.

Figure 11:
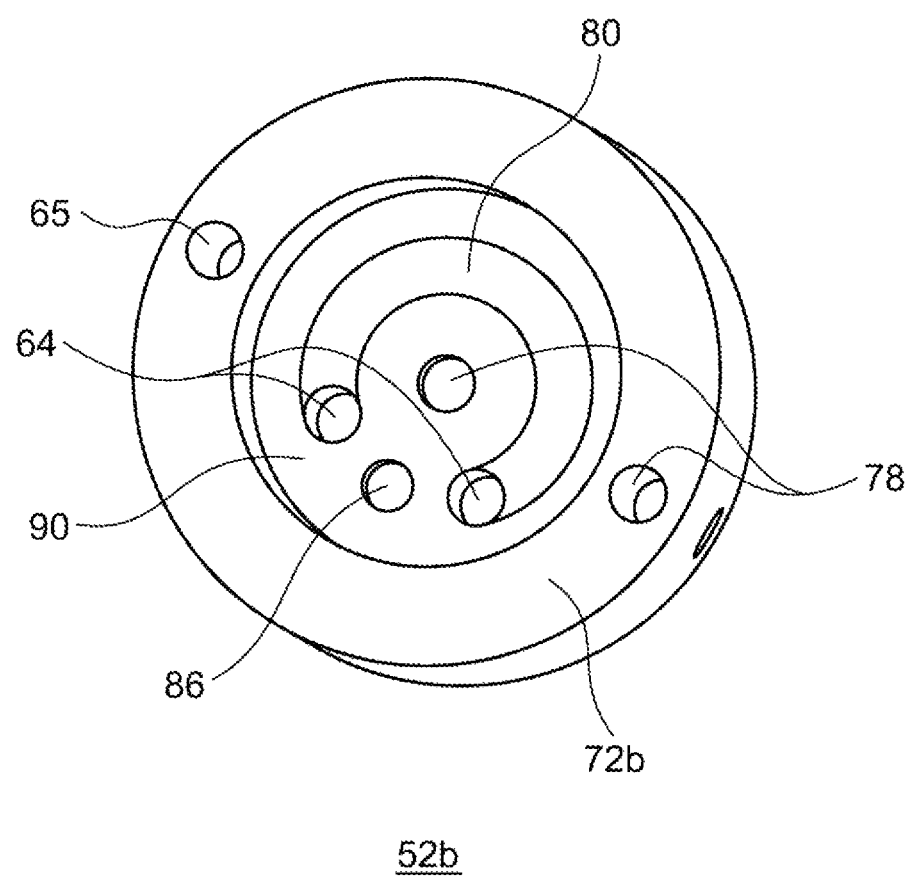
FIG. 11 is a schematic perspective diagram showing the second valve rotor according to the embodiment.

As shown in FIG. 8A, the main low-pressure port 64 penetrates the second valve rotor 52b from the upper surface of the second valve rotor 52b. In addition, the main low-pressure port 64 includes an arc-shaped low-pressure groove 80. The arc-shaped low-pressure groove 80 is formed on a surface (that is, a surface of the second valve rotor 52b facing the upper surface of the first valve rotor 52a) where the first valve rotor 52a is in contact with the second valve rotor 52b (indicated by dashed line). As also shown in FIG. 11, the arc-shaped low-pressure groove 80 and the first rotor low-pressure flow path 76 are located on substantially the same circumference about the valve rotation axis 56. The first rotor low-pressure flow path 76 is always connected to the main low-pressure port 64 through the arc-shaped low-pressure groove 80. In this way, the main low-pressure port 64 is formed in the second valve rotor 52b so as to avoid the second rotor high-pressure flow path 78.

The auxiliary low-pressure port 65, the first rotor low-pressure flow path 76, the first rotor high-pressure flow path 74, and the second rotor high-pressure flow path 78 are aligned in a row along a center line of the first valve rotor 52a passing through the valve rotation axis 56. As shown in FIG. 7B, in the case of the cooling valve timing, the auxiliary low-pressure port 65 is adjacent to the first rotor high-pressure flow path 74, and the second rotor high-pressure flow path 78 is adjacent to the first rotor low-pressure flow path 76.

As described above, an angular relative position relationship between the first valve rotor 52a and the second valve rotor 52b is different between the cooling valve timing and the heating valve timing. As can be seen by comparing FIG. 7B with FIG. 7C (or FIG. 8A with FIG. 9A), the second valve rotor 52b is rotated 180° with respect to the first valve rotor 52a. As shown in FIG. 7C, in the case of the heating valve timing, the auxiliary low-pressure port 65 is adjacent to the first rotor low-pressure flow path 76, and the second rotor high-pressure flow path 78 is adjacent to the first rotor high-pressure flow path 74.

As shown in FIG. 7B, the first valve rotor 52a has a first cylindrical surface 73a, and the second valve rotor 52b has a second cylindrical surface 73b. The first cylindrical surface 73a is a side surface of the first valve rotor 52a, and the second cylindrical surface 73b is an inner side surface of the second valve rotor 52b. The first cylindrical surface 73a and the second cylindrical surface 73b are in contact with each other.

The rotary valve 36 is configured such that an inlet/outlet of the working gas flow path does not exist in any of the first cylindrical surface 73a and the second cylindrical surface 73b. The working gas flow paths of the first valve rotor 52a all penetrate the first valve rotor 52a from the first rotor plane 72a which is the rotation sliding surface to the upper surface which is the surface opposite to the first rotor plane 72a. The working gas flow path of the second valve rotor 52b penetrates the second valve rotor 52b from the second rotor plane 72b which the rotation sliding surface to the upper surface or a contact surface with the first valve rotor 52a.

In this way, the working gas flow path does not exist, and thus, it is not necessary to provide a seal member such as an O-ring between the first cylindrical surface 73a and the second cylindrical surface 73b. If a seal member is provided, a relative rotation of the second valve rotor 52b with respect to the first valve rotor 52a may cause undesirable deformation of the seal member. As a result, durability of the seal member may be affected.

In an embodiment, the rotary valve 36 may be configured such that the working gas flow path inlet/outlet exists in the first cylindrical surface 73a and the second cylindrical surface 73b. In this case, a seal member such as an O-ring may be provided between the first cylindrical surface 73a and the second cylindrical surface 73b.

In order to improve the slidability in the relative rotation, it is desirable that the first valve rotor 52a and the second valve rotor 52b are formed of different materials. Similarly, for favorable sliding, it is desirable that the valve stator 50 and the valve rotor 52 are formed of different materials. For example, in a case where one of two sliding parts is formed of a metal material (for example, an aluminum material or an iron material) and the other is formed of a resin material (for example, an engineering plastic material or a fluorocarbon resin material), favorable slidability can be obtained.

Therefore, the first stator plane 70a may be formed of a resin material, the second stator plane 70b may be formed of a metal material, the first rotor plane 72a may be formed of a metal material, and the second rotor plane 72b may be formed of a resin material. Alternatively, the first stator plane 70a may be formed of a metal material, the second stator plane 70b may be formed of a resin material, the first rotor plane 72a may be formed of a resin material, and the second rotor plane 72b may be formed of a metal material. Here, only a portion of the valve rotor including the rotor plane or only a portion of the valve stator including the stator plane may be formed of a desired material. Alternatively, the entire valve stator or the entire valve rotor may be formed of a desired material.

In the rotary valve 36, the main intake on/off valve V1 is constituted by the high-pressure port 62, the first rotor high-pressure flow path 74, and the regenerator port 58. While the valve rotor 52 rotates, when the first rotor high-pressure flow path 74 overlaps the regenerator port 58, the high-pressure port 62 is connected to the regenerator port 58. The high-pressure working gas can flow from the high-pressure port 62 into the regenerator port 58 through the first rotor high-pressure flow path 74. This is an open state of the main intake on/off valve V1 (FIG. 8A and FIG. 9A). Meanwhile, when the first rotor high-pressure flow path 74 does not overlap the regenerator port 58, the high-pressure port 62 is disconnected from the regenerator port 58, and the working gas cannot flow from the high-pressure port 62 into the regenerator port 58. This is a closed state of the main intake on/off valve V1 (FIG. 8B and FIG. 9B).

The main exhaust on/off valve V2 is constituted by the regenerator port 58, the first rotor low-pressure flow path 76, and the main low-pressure port 64. While the valve rotor 52 rotates, when the first rotor low-pressure flow path 76 overlaps the regenerator port 58, the regenerator port 58 is connected to the main low-pressure port 64. A low-pressure working gas can flow out from the regenerator port 58 to the main low-pressure port 64 through the first rotor low-pressure flow path 76. This is an open state of the main exhaust on/off valve V2 (FIG. 8B and FIG. 9B). Meanwhile, when the first rotor low-pressure flow path 76 does not overlap the regenerator port 58, the regenerator port 58 is disconnected from the main low-pressure port 64, and the working gas cannot flow out from the regenerator port 58 to the main low-pressure port 64. This is a closed state of the main exhaust on/off valve V2 (FIG. 8A and FIG. 9A).

The auxiliary intake on/off valve V3 is constituted by the high-pressure port 62, the first rotor high-pressure flow path 74, the second rotor high-pressure flow path 78, and the pulse tube port 60. While the valve rotor 52 rotates, when the second rotor high-pressure flow path 78 overlaps the pulse tube port 60, the high-pressure port 62 is connected to the pulse tube port 60. The high-pressure working gas can flow from the high-pressure port 62 into the pulse tube port 60 through the first rotor high-pressure flow path 74 and the second rotor high-pressure flow path 78. This is an open state of the auxiliary intake on/off valve V3 (FIG. 8A and FIG. 9A). Meanwhile, when the second rotor high-pressure flow path 78 does not overlap the pulse tube port 60, the high-pressure port 62 is disconnected from the pulse tube port 60, and the working gas cannot flow from the high-pressure port 62 into the pulse tube port 60. This is a closed state of the auxiliary intake on/off valve V3 (FIG. 8B and FIG. 9B).

The auxiliary exhaust on/off valve V4 is constituted by the pulse tube port 60 and the auxiliary low-pressure port 65. While the valve rotor 52 rotates, when the auxiliary low-pressure port 65 overlaps the pulse tube port 60, the pulse tube port 60 is connected to the auxiliary low-pressure port 65, and the low-pressure working gas can flow out from the pulse tube port 60 to the auxiliary low-pressure port 65. This is an open state of the auxiliary exhaust on/off valve V4 (FIG. 8B and FIG. 9B). Meanwhile, when the auxiliary low-pressure port 65 does not overlap the pulse tube port 60, the pulse tube port 60 is disconnected from the auxiliary low-pressure port 65, and the working gas cannot flow out from the pulse tube port 60 to the auxiliary low-pressure port 65. This is a closed state of the auxiliary exhaust on/off valve V4 (FIG. 8A and FIG. 9A).

Figure 10:
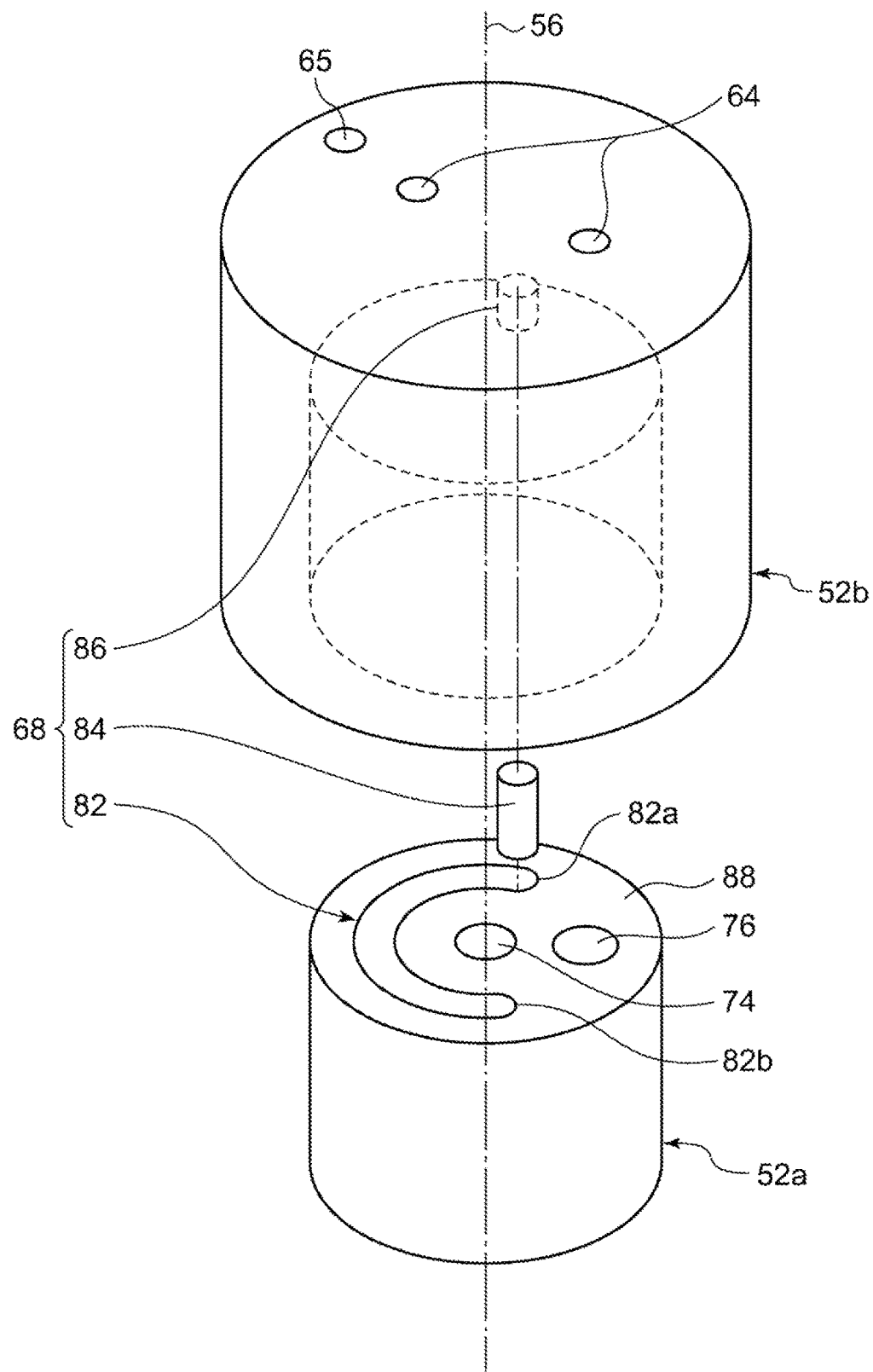
FIG. 10 is a schematic perspective exploded diagram showing a first valve rotor and a second valve rotor according to the embodiment.

Finally, an exemplary configuration of the valve rotor connection mechanism 68 will be described with reference to FIGS. 10 and 11. FIG. 10 is a schematic perspective exploded diagram showing the valve rotor 52 according to the embodiment, and FIG. 11 is a schematic perspective diagram showing the second valve rotor 52b according to the embodiment. In FIG. 11, the recess formed on the second valve rotor 52b to receive the first valve rotor 52a is shown together with the second rotor plane 72b.

The valve rotor connection mechanism 68 includes a connection pin guide groove 82, a connection pin 84, and a connection pin fixing hole 86. The connection pin guide groove 82 is formed on an upper surface 88 of the first valve rotor 52a. The connection pin guide groove 82 is formed in an arc shape about the valve rotation axis 56. The connection pin guide groove 82 has a first groove end portion 82a and a second groove end portion 82b. The first groove end portion 82a and the second groove end portion 82b correspond to both ends of the connection pin guide groove 82 in a circumferential direction. A size of a central angle of the connection pin guide groove 82 corresponds to the phase difference between the first relative angle and the second relative angle. Therefore, for example, the size of the central angle of the connection pin guide groove 82 is an angle selected from the range of 120° to 240°, or selected from the range of 150° to 210°. In the present embodiment, the size of the central angle of the connection pin guide groove 82 is about 180°.

The connection pin 84 is fixedly supported by the second valve rotor 52b. The connection pin 84 extends in parallel with the valve rotation axis 56. One end of the connection pin 84 is inserted into the connection pin guide groove 82, and the other end thereof is attached to the connection pin fixing hole 86. The connection pin 84 may be fitted in and fixed to the connection pin fixing hole 86, or may be inserted into the connection pin fixing hole 86 with a little play. The connection pin fixing hole 86 is formed in the second valve rotor 52b. The connection pin fixing hole 86 is formed in a contact surface 90 where the second valve rotor 52b is in contact with the upper surface 88 of the first valve rotor 52a. The connection pin guide groove 82 and the connection pin fixing hole 86 are located on the same circumference about the valve rotation axis 56. The connection pin fixing holes 86 are also located on the same circumference as the arc-shaped low-pressure groove 80.

The connection pin 84 engages with the first groove end portion 82a of the connection pin guide groove 82 such that the first valve rotor 52a holds the first relative angle relative to the second valve rotor 52b when the reversible motor 38 shown in FIGS. 1 and 6 rotates forward. In addition, the connection pin 84 engages with the second groove end portion 82b of the connection pin guide groove 82 such that the first valve rotor 52a holds the second relative angle relative to the second valve rotor 52b when the reversible motor 38 rotates backward. The connection pin guide groove 82 is formed to guide the connection pin 84 from the first groove end portion 82a to the second groove end portion 82b when the rotation direction of the reversible motor 38 is switched from the forward rotation to the backward rotation and to guide the connection pin 84 from the second groove end portion 82b to the first groove end portion 82a when the rotation direction of the reversible motor 38 is switched from the backward rotation to the forward rotation.

Therefore, when the rotation direction of the reversible motor 38 is switched from the forward rotation to the backward rotation, the second valve rotor 52b is angularly displaced with respect to the first valve rotor 52a, and a relative angle of both valve rotors is switched from the first relative angle to the second relative angle. In addition, when the rotation direction of the reversible motor 38 is switched from the backward rotation to the forward rotation, the second valve rotor 52b is angularly displaced with respect to the first valve rotor 52a, and the relative angle of both valve rotors is switched from the second relative angle to the first relative angle.

In this way, the relative angle between the first valve rotor 52a and the second valve rotor 52b can be switched with a relatively simple structure of a combination of the connection pin guide groove 82 and the connection pin 84.

In addition, the connection pin guide groove 82 may be formed in the second valve rotor 52b, and the connection pin 84 may be fixedly supported by the first valve rotor 52a. The connection pin fixing hole 86 may be formed in the first valve rotor 52a.

In FIG. 11, the arc-shaped low-pressure groove 80 formed on the contact surface 90 of the second valve rotor 52b is shown. A central angle of the arc-shaped low-pressure groove 80 may be larger than or equal to the phase difference between the first relative angle and the second relative angle. In the present embodiment, the central angle of the arc-shaped low-pressure groove 80 is about 270°, which is larger than about 180° of the phase difference between the first relative angle and the second relative angle. In this way, even if the relative angle between both valve rotors is switched, the main low-pressure port 64 can be always connected to the first rotor low-pressure flow path 76 through the arc-shaped low-pressure groove 80.

Hereinbefore, the present invention is described based on the embodiment. It is understood by a person skilled in the art that the present invention is not limited to the above embodiment, various design changes are possible, and various modification examples are possible, and the modification examples are within a scope of the present invention.

In the above embodiment, an inner cylindrical portion (first valve stator 50a and first valve rotor 52a) of the rotary valve 36 constitutes the main pressure switching valve 14, and an outer cylindrical portion (second valve stator 50b and second valve rotor 52b) of the rotary valve 36 constitutes the auxiliary pressure switching valve 20. However, it is also possible that the inner cylindrical portion of the rotary valve 36 can constitute the auxiliary pressure switching valve 20 and the outer cylindrical portion of the rotary valve 36 can constitute the main pressure switching valve 14. In addition, the flow path configuration inside the rotary valve 36 is not limited to the described flow path configuration, and various specific configurations are possible.

Figure 12:
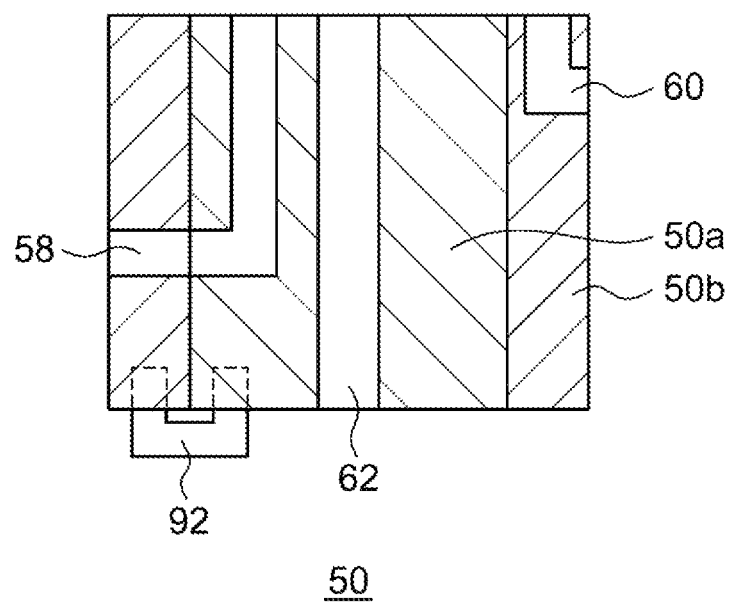
FIG. 12 is a schematic cross-sectional view showing a valve stator according to another embodiment.

In the above embodiment, the valve rotor 52 is divided into two parts, and the relative positions of the two parts can be switched. However, the present invention is not limited to this. FIG. 12 is a schematic cross-sectional view showing a valve stator according to another embodiment. In an embodiment, the valve stator 50 may be divided into two parts, and relative positions of the two parts can be switched. In this case, the valve rotor 52 may be a single part in which the first valve rotor 52a and the second valve rotor 52b are integrated with each other. The rotary valve 36 may include a valve stator connection mechanism 92 which connects the first valve stator 50a and the second valve stator 50b to each other such that when the reversible motor 38 rotates forward, the first valve stator 50a holds the first relative angle relative to the second valve stator 50b, and when the reversible motor 38 rotates backward, the first valve stator 50a holds the second relative angle relative to the second valve stator 50b (refer to FIG. 12).

The valve stator connection mechanism 92 may be configured to connect the first valve stator 50a to the second valve stator 50b by a fastener such as a bolt, and may be configured to perform switching between the first relative angle and the second relative angle. For example, the valve stator connection mechanism 92 may be manually removable from the valve stator 50, and may be attachable to the valve stator 50 again after the relative angle is switched.

In the above embodiment, the valve rotor 52 is divided into two parts, and the relative angle around the valve rotation axis 56 can be switched as the relative position of the two parts. However, the present invention is not limited to this. If applicable, the rotary valve 36 may be configured to perform switching between the cooling valve timing and the heating valve timing by a relative movement of the first valve rotor 52a and the second valve rotor 52b in a rotational axis direction. In addition, the rotary valve 36 may be configured to perform switching between the cooling valve timing and the heating valve timing by the relative movement of the first valve stator 50a and the second valve stator 50b in the rotational axis direction.

FIGS. 13A and 13B are schematic cross-sectional views showing a rotary valve 36 according to still another embodiment. For convenience of description, an internal flow path of the rotary valve 36 is not shown in FIGS. 13A and 13B.

In the shown rotary valve 36, in a case where a first resin valve member is surrounded by the first metal valve member, the first resin valve member axially protrudes with respect to the first metal valve member, and thus, a rotation sliding surface of the first resin valve member is located at an axial height different from that of a rotation sliding surface of the first metal valve member. In addition, in a case where a second metal valve member is surrounded by a second resin valve member, the second resin valve member axially protrudes with respect to the second metal valve member, and thus, a rotation sliding surface of the second resin valve member is located at an axial height different from that of a rotation sliding surface of the second metal valve member.

The second metal valve member is disposed to slide rotationally with the first resin valve member, and a diameter (for example, outer diameter) of the first resin valve member is smaller than a diameter (that is, outer diameter) of the second metal valve member. In addition, the first metal valve member is disposed to slide rotationally with the second resin valve member, and a diameter (for example, outer diameter) of the second resin valve member is smaller than the diameter (for example, outer diameter) of the second metal valve member.

As a result, a portion of the first resin valve member including the rotation sliding surface enters a recess surrounded by the second resin valve member. The first resin valve member has a gap between the first resin valve member and the second resin valve member in a radial direction. The first metal valve member is disposed at a distance from the second metal valve member in an axial direction.

The first resin valve member and/or the second resin valve member may wear out due to a long-term use of the rotary valve 36. However, since the first metal valve member is disposed at a distance from the second metal valve member in the axial direction, a contact between the first metal valve member and the second metal valve can be avoided even if the resin valve member is some worn.

For example, in the rotary valve 36 shown in FIG. 13A, the first valve stator 50a is formed of a metal material, and the second valve stator 50b is formed of a resin material. The first valve rotor 52a is formed of a resin material, and the second valve rotor 52b is formed of a metal material. The second valve stator 50b axially protrudes with respect to the first valve stator 50a. Therefore, an axial height of the second stator plane 70b is higher than that of the first stator plane 70a (in the drawing, the second stator plane 70b is located above the first stator plane 70a). The first valve rotor 52a protrudes axially with respect to the second valve rotor 52b. Therefore, the axial height of the first rotor plane 72a is higher than that of the second rotor plane 72b (in the drawing, the first rotor plane 72a is located below the second rotor plane 72b).

A diameter of the first valve rotor 52a is smaller than a diameter of the first valve stator 50a. Therefore, an inner diameter of the second valve rotor 52b is smaller than an inner diameter of the second valve stator 50b. Further, an outer diameter of the second valve stator 50b is smaller than an outer diameter of the second valve rotor 52b.

Therefore, an end portion of the first valve rotor 52a including the first rotor plane 72a enters a recess surrounded by the second valve stator 50b. The first valve rotor 52a has a gap 94 between the first valve rotor 52a and the second valve stator 50b in a radial direction. The second valve rotor 52b is disposed at a distance from the first valve stator 50a in an axial direction. An axial height of the gap 94 corresponds to an axial distance from the first valve stator 50a to the second valve rotor 52b.

In the rotary valve 36 shown in FIG. 13B, the second valve stator 50b is formed of a metal material, and the first valve stator 50a is formed of a resin material. The second valve rotor 52b is formed of a resin material, and the first valve rotor 52a is formed of a metal material. The first valve stator 50a axially protrudes with respect to the second valve stator 50b. Therefore, an axial height of the first stator plane 70a is higher than that of the second stator plane 70b. The second valve rotor 52b protrudes axially with respect to the first valve rotor 52a. Therefore, the axial height of the second rotor plane 72b is higher than that of the first rotor plane 72a.

A diameter of the first valve stator 50a is smaller than a diameter of the first valve rotor 52a. Therefore, an inner diameter of the second valve stator 50b is smaller than an inner diameter of the second valve rotor 52b. Further, an outer diameter of the second valve rotor 52b is smaller than an outer diameter of the second valve stator 50b.

Therefore, an end portion of the first valve stator 50a including the first stator plane 70a enters a recess surrounded by the second valve rotor 52b. The first valve stator 50a has a gap 94 between the first valve stator 50a and the second valve rotor 52b in a radial direction. The first valve rotor 52a is disposed at a distance from the second valve stator 50b in an axial direction. An axial height of the gap 94 corresponds to an axial distance from the second valve stator 50b to the first valve rotor 52a.

In an embodiment, a rotary valve may include a first valve element which is one of a valve rotor rotatable around a rotary valve rotation axis and a valve stator and a second valve element which is the other of the valve rotor and the valve stator. The first valve element may include a first part which is configured to alternately connects a regenerator to a compressor discharge port and a compressor suction port by a relative rotation with respect to the second valve element, and a second part which is configured to alternately connect a pulse tube to the compressor discharge port and the compressor suction port by the relative rotation with respect to the second valve element. The rotary valve may have a connection mechanisms which connects the first part and the second part to each other such that the first part holds a first relative angle relative to the second part around a rotary valve rotation axis when a reversible motor rotates forward and the first part holds a second relative angle relative to the second part around the rotary valve rotation axis when the reversible motor rotates backward. The first relative angle may be designed to cool a pulse tube cryocooler, and the second relative angle may be designed to heat the pulse tube cryocooler. The connection mechanism may be configured to perform switching between the first relative angle and the second relative angle in accordance with reversal in a rotation direction of the reversible motor.

The first valve element may be a valve rotor, the second valve element may be a valve stator, and the first part and the second part may be a first valve rotor and a second valve rotor, respectively. Alternatively, the first valve element may be the valve stator, the second valve element may be the valve rotor, and the first part and the second part may be the first valve stator and the second valve stator, respectively.

The above embodiments are described with reference to a four-valve type pulse tube cryocooler as an example. However, the present invention is not limited to this. The rotary valve unit according to the embodiment may be adopted to other GM type pulse tube cryocoolers such as an active buffer type cryocooler or 5-valve type cryocooler, or other pulse tube cryocooler if applicable. In addition, the application of the rotary valve unit according to the embodiment is not limited to the single-stage pulse tube cryocooler, but can be applied to a multi-stage pulse tube cryocooler having two or more stages.

The present invention can be used in fields of the pulse tube cryocooler and the rotary valve unit for a pulse tube cryocooler.

It should be understood that the invention is not limited to the above-described embodiment, but may be modified into various forms on the basis of the spirit of the invention. Additionally, the modifications are included in the scope of the invention.

What is claimed is:

1. A pulse tube cryocooler comprising:
a regenerator which includes a regenerator high-temperature end and a regenerator low-temperature end;
a pulse tube which includes a pulse tube high-temperature end and a pulse tube low-temperature end in communication with the regenerator low-temperature end;
a rotary valve which alternately connects the regenerator high-temperature end to a compressor discharge port and a compressor suction port to generate a working gas pressure oscillation in the pulse tube, and which is connected to the pulse tube high-temperature end to control a phase delay of a working gas displacement oscillation in the pulse tube with respect to the working gas pressure oscillation, the rotary valve being operated according to a cooling valve timing for cooling the pulse tube cryocooler or a heating valve timing for heating the pulse tube cryocooler; and
a reversible motor which is connected to the rotary valve to rotate the rotary valve around a rotary valve rotation axis,
wherein the rotary valve includes:
a valve stator,
a first valve rotor which is connected to the reversible motor to rotate with respect to the valve stator around the rotary valve rotation axis, the first valve rotor being configured to alternately connect the regenerator high-temperature end to the compressor discharge port and the compressor suction port by a rotation,
a second valve rotor which is connected to the reversible motor to rotate with respect to the valve stator around the rotary valve rotation axis, the second valve rotor being configured to alternately connect the pulse tube high-temperature end to the compressor discharge port and the compressor suction port by a rotation, and
a valve rotor connection mechanism which connects the first valve rotor and the second valve rotor to each other such that when the reversible motor rotates in a forward direction, both valve rotors rotate around the rotary valve rotation axis while the first valve rotor holds a first relative angle relative to the second valve rotor, and when the reversible motor rotates in a backward direction, both valve rotors rotate around the rotary valve rotation axis while the first valve rotor holds a second relative angle relative to the second valve rotor, and wherein the second relative angle is different from the first relative angle.

2. The pulse tube cryocooler according to claim 1,
wherein the rotary valve is configured to operate according to the cooling valve timing when the reversible motor rotates in a forward direction, and is configured to operate according to the heating valve timing when the reversible motor rotates in a backward direction,
wherein the cooling valve timing is designed to generate the working gas pressure oscillation and apply a first phase delay to the working gas displacement oscillation with respect to the working gas pressure oscillation, and
wherein the heating valve timing is designed to generate the working gas pressure oscillation and apply a second phase delay to the working gas displacement oscillation with respect to the working gas pressure oscillation, and the second phase delay is different from the first phase delay.

3. The pulse tube cryocooler according to claim 1,
wherein the second relative angle is shifted from the first relative angle by an angle selected from a range of 120° to 240°.

4. The pulse tube cryocooler according to claim 1,
wherein the second relative angle is shifted from the first relative angle by an angle selected from a range of 150° to 210°.

5. The pulse tube cryocooler according to claim 1,
wherein the valve rotor connection mechanism includes
an arc-shaped connection pin guide groove which is formed in one of the first valve rotor and the second valve rotor about the rotary valve rotation axis, and
a connection pin which is fixedly supported by the other of the first valve rotor and the second valve rotor, the connection pin engaging with a first groove end portion of the connection pin guide groove such that the first valve rotor holds the first relative angle relative to the second valve rotor when the reversible motor rotates in a forward direction and engages with a second groove end portion of the connection pin guide groove such that the first valve rotor holds the second relative angle relative to the second valve rotor when the reversible motor rotates in a backward direction, and
wherein the connection pin guide groove is formed to guide the connection pin from the first groove end portion to the second groove end portion when a rotation direction of the reversible motor is switched from a forward direction to a backward direction and guide the connection pin from the second groove end portion to the first groove end portion when the rotation direction of the reversible motor is switched from the backward direction to the forward direction.

6. The pulse tube cryocooler according to claim 1,
wherein the first valve rotor has a first cylindrical surface, the second valve rotor has a second cylindrical surface, and the first cylindrical surface and the second cylindrical surface are in contact with each other, and
wherein the rotary valve is configured such that an inlet/outlet of a working gas flow path does not exist in both of the first cylindrical surface and the second cylindrical surface.

7. The pulse tube cryocooler according to claim 1,
wherein the valve stator includes a first valve stator having a first stator plane formed of a resin material and a second valve stator having a second stator plane formed of a metal material, the first valve rotor has a first rotor plane which is formed of a metal material and is in surface contact with the first stator plane, and the second valve rotor has a second rotor plane which is formed of a resin material and is in surface contact with the second stator plane, or wherein the valve stator includes a first valve stator having a first stator plane formed of a metal material and a second valve stator having a second stator plane formed of a resin material, the first valve rotor has a first rotor plane which is formed of a resin material and is in surface contact with the first stator plane, and the second valve rotor has a second rotor plane which is formed of a metal material and is in surface contact with the second stator plane.

8. The pulse tube cryocooler according to claim 1,
wherein the rotary valve has a group of valves including:
a main intake on/off valve which connects the regenerator high-temperature end to the compressor discharge port,
a main exhaust on/off valve which connects the regenerator high-temperature end to the compressor suction port,
an auxiliary intake on/off valve which connects the pulse tube high-temperature end to the compressor discharge port, and
an auxiliary exhaust on/off valve which connects the pulse tube high-temperature end to the compressor suction port.

9. A rotary valve unit for a pulse tube cryocooler, comprising:
a rotary valve which alternately connects a regenerator high-temperature end to a compressor discharge port and a compressor suction port to generate a working gas pressure oscillation in a pulse tube and is connected to a pulse tube high-temperature end to control a phase delay of a working gas displacement oscillation in the pulse tube with respect to the working gas pressure oscillation, the rotary valve being operated according to a cooling valve timing for cooling the pulse tube cryocooler or a heating valve timing for heating the pulse tube cryocooler; and
a reversible motor which is connected to the rotary valve to rotate the rotary valve around a rotary valve rotation axis,
wherein the rotary valve includes:
a valve stator,
a first valve rotor which is connected to the reversible motor to rotate with respect to the valve stator around the rotary valve rotation axis, the first valve rotor being configured to alternately connect the regenerator high-temperature end to the compressor discharge port and the compressor suction port by a rotation,
a second valve rotor which is connected to the reversible motor to rotate with respect to the valve stator around the rotary valve rotation axis, the second valve rotor being configured to alternately connect the pulse tube high-temperature end to the compressor discharge port and the compressor suction port by a rotation, and
a valve rotor connection mechanism which connects the first valve rotor and the second valve rotor to each other such that when the reversible motor rotates in a forward direction, both valve rotors rotate around the rotary valve rotation axis while the first valve rotor holds a first relative angle relative to the second valve rotor, and when the reversible motor rotates in a backward direction, both valve rotors rotate around the rotary valve rotation axis while the first valve rotor holds a second relative angle relative to the second valve rotor, and wherein the second relative angle is different from the first relative angle.

* * * * *